(12) United States Patent
Kimishima et al.

(10) Patent No.: US 8,426,553 B2
(45) Date of Patent: Apr. 23, 2013

(54) METHOD FOR REMOVING DILUENT FROM A POLYMER EXTRUDATE, AND ITS APPLICATIONS

(75) Inventors: Kotaro Kimishima, Yokohama (JP); Sadakatsu Suzuki, Kawaguchi (JP)

(73) Assignee: Toray Battery Separator Film Co., Ltd., Tochigi (JP)

( * ) Notice: Subject to any disclaimer, the term of this patent is extended or adjusted under 35 U.S.C. 154(b) by 283 days.

(21) Appl. No.: 12/808,095

(22) PCT Filed: Dec. 12, 2008

(86) PCT No.: PCT/JP2008/073144
§ 371 (c)(1),
(2), (4) Date: Aug. 13, 2010

(87) PCT Pub. No.: WO2009/078478
PCT Pub. Date: Jun. 25, 2009

(65) Prior Publication Data
US 2010/0289174 A1    Nov. 18, 2010

(30) Foreign Application Priority Data

Dec. 14, 2007  (JP) .................. 2007-324045

(51) Int. Cl.
*B29B 17/00* (2006.01)
*D06P 1/52* (2006.01)

(52) U.S. Cl.
USPC ............... 528/494; 429/50; 429/249; 521/64

(58) Field of Classification Search .................... 429/50, 429/249; 521/64
See application file for complete search history.

(56) References Cited

FOREIGN PATENT DOCUMENTS

| | | |
|---|---|---|
| JP | 50-112309 A | 9/1975 |
| JP | 60-212433 A | 10/1985 |
| JP | 60-242035 A | 12/1985 |
| JP | 06-031255 A | 2/1994 |
| JP | 11-207093 A | 8/1999 |
| JP | 2002-012694 A | 1/2002 |
| JP | 2002-012695 A | 1/2002 |
| JP | 2002-256099 A | 9/2002 |

*Primary Examiner* — Terressa Boykin
(74) *Attorney, Agent, or Firm* — Sughrue Mion, PLLC

(57) ABSTRACT

A method for removing a process solvent (P-sol) from a polymer extrudate, especially in connection with a process for producing a microporous membrane. The method involves contacting the extrudate with chlorinated hydrocarbon (CHC) and hydrofluoroether (HFE) in a first stage; contacting the extrudate from the first stage with HFE in a second stage; combining the first and second waste streams and then separating the P-sol from the combined streams to make an HFE-CHC stream; cooling the HFE-CHC stream to make an HFE-rich phase and a CHC-rich phase; and conducting the CHC-rich phase and/or the HFE-rich phase to step (A).

11 Claims, 8 Drawing Sheets

METHOD FOR REMOVING DILUENT FROM A POLYMER EXTRUDATE, AND ITS APPLICATIONS

CROSS REFERENCE TO RELATED APPLICATIONS

This application is a National Stage of International Application No. PCT/JP2008/073144 filed Dec. 12, 2008, claiming priority based on Japanese Patent Application No. 2007-324045 filed Dec. 14, 2007, the contents of all of which are incorporated herein by reference in their entirety.

FIELD OF THE INVENTION

The invention relates to a method for removing diluent (e.g., solvent) from a polymer extrudate, especially in connection with a process for producing microporous polymeric membranes.

BACKGROUND OF THE INVENTION

Microporous thermoplastic membranes can be used as battery separators in, e.g., primary and secondary lithium secondary batteries, lithium polymer batteries, nickel-hydrogen batteries, nickel-cadmium batteries, nickel-zinc batteries, silver-zinc secondary batteries, etc. When microporous thermoplastic membranes are used for battery separators, particularly lithium ion battery separators, the membranes' properties significantly affect the performance, productivity and safety of the resulting batteries. Such microporous polymeric (e.g., thermoplastic) membranes can be produced, e.g., by "dry" or "wet" processes. Dry processes involve producing the membrane from a polymer melt. Wet processes involve combining one or more polymers with diluent (e.g., solvent) to form a polyolefin solution, extruding the polyolefin solution to form a sheet, and then removing at least a portion of the diluent form the sheet to form a polymeric membrane. As might be appreciated, diluent removal is an important process step in the wet process.

In a wet process, the diluent (also called a solvent, membrane-forming solvent, or process solvent) is generally removed from a cooled extrudate to form the polymeric membrane. Generally, the diluent used to produce the polymer solution is called the "process solvent" or "P-Sol", and the washing solvent used for washing (or displacing) the process solvent from the extrudate is called the "washing solvent". For example, JP60-242035A discloses that a chlorine containing solvent, such as dichloromethane (DCM) can be used as a washing solvent to remove a liquid paraffin process solvent from an extrudate. One problem with this approach is that the surface tension of residual DCM in pores of microporous membrane after washing can degrade the membrane's properties. While it might be possible to overcome this problem by adding an agent capable of modifying the surface tension of the DCM in the membrane's pores, residual surface agent in the membrane's pores might undesirable affect the membrane's porosity.

JP2002-012694 A, JP2002-012695A and JP2002-256099 A disclose washing solvents such as hydrofluoroether (HFE), either alone or in combination with other solvents such as decane. While HFE has a low surface tension, and HFE does not degrade microporous membrane's properties as much as DCM alone, HFE is not as good a washing solvent as DCM because HFE is less miscible with commonly-used process solvents (such as liquid paraffin) than is DCM. Consequently, the rate of removing process solvent by washing the extrudate with HFE is lower than when DCM is used. Since the removal rate is lower, longer washing times are needed, which causes a decrease in the amount of membrane produced by the wet process. Mixtures of HFE and DCM have been proposed for process solvent removal since HFE-DCM mixtures generally have a lower surface tension than DCM. Consequently, using an HFE-DCM mixture as a washing solvent does not degrade microporous membrane's properties as much as when the washing solvent is DCM alone. Moreover, DCM and HFE are more miscible with commonly used process solvents than is HFE alone.

JP2002-256099 A discloses using DCM as a first washing solvent in a first washing stage and HFE as a second washing solvent in a second washing stage downstream of the first washing stage. The second washing stage uses HFE to rinse away at least some of the DCM remaining in the extrudate after the first washing stage. For this reason, the HFE can be called a rinsing solvent. Using this approach, the problems associated with residual DCM in the membrane's pores can be overcome since the HFE rinsing step removes the undesirable DCM. Even so, such a process is difficult to operate continuously because the DCM rinsed from the membrane in the second stage will accumulate in the HFE. Accordingly, the FIFE can be replaced with fresh HFE, and/or the DCM should be separated from the HFE so that the HFE can be made available for recycle and re-use. The first option is inefficient and expensive. The second option (removing the DCM from the HFE and recycling the purified HFE) is problematic because HFE is miscible with DCM. Moreover, HFE and DCM are difficult to separate by conventional methods (e.g., fractional distillation) because they have similar boiling points. Finally, even if separation by fractional distillation could be accomplished efficiently, HFE and DCM together form an azeotrope which contains a significant amount of both HFE and DCM. As might be appreciated, such an azeotrope cannot be separated by distillation.

It would therefore be desirable to further improve the wet process by efficiently recycling and re-using DCM, HFE, or both.

SUMMARY OF THE INVENTION

In an embodiment, the invention relates to a method for removing a process solvent for polymer from an extrudate. Preferably the process operated continuously or semi-continuously.

In an embodiment, the invention relates to a method for removing a process solvent from a polymeric extrudate, comprising:
(A) contacting the polymeric extrudate with hydrofluoroether(s) and chlorinated hydrocarbon(s) in a first stage to remove at least a portion of the process solvent from the polymer extrudate and conducting away a first stream comprising at least a portion of the process solvent, at least a portion of the hydrofluoroether(s), and at least a portion of the chlorinated hydrocarbon(s) and washed polymeric extrudate containing residual chlorinated hydrocarbon(s) in pores.

In a related embodiment, the process further comprises (B) contacting the polymeric extrudate from step (A) with hydrofluoroether(s) in a second stage to remove at least a portion of the residual chlorinated hydrocarbon(s) from the pores of the washed extrudate and conducting a second stream away from the second stage, the second stream comprising at least a portion of the hydrofluoroether(s) of the second stage and at least a portion of the residual chlorinated hydrocarbon(s). In further embodiments, the invention relates to one or more of the following additional steps: (C) optionally, drying the polymeric extrudate of step (B) to remove at least a portion of any remaining hydrofluoroether(s) ("HFE") in the pores of the extrudate; (D) combining the first and second streams and then separating the process solvent ("P-sol") from the combined streams to make a third stream comprising the HFE and chlorinated hydrocarbon(s) ("CHC") of the first and second streams; (E) cooling the third stream and separating FIFE-rich phase from a CHC-rich phase.

In yet other embodiments, the invention relates to a process comprising steps A through E and the following step (F):
where step (F) is one or more of;
(a) conducting at least a portion of the CHC-rich phase from step (E) to step (A);
(b) conducting at least a portion of the HFE-rich phase from step (E) to step (A), step (B), or both;
(c) (i) separating a first product comprising purified CHC and a second product comprising HFE and CHC from the CHC-rich phase from step (E), and then carrying out at least one of the following steps (c) (ii) or (c) (iii)
  (ii) conducting at least a portion of the first product to step (A),
  (iii) conducting at least a portion of the second product to the first stage, the second stage, or both,
(d) (i) separating a third product comprising purified HFE and fourth product from the HFE-rich phase of step (E), and then carrying out at least one of the following steps (d)(ii) or (d)(iii)
  (ii) conducting at least a portion of the third product to at least one of step (A) or (B),
  (iii) conducting at least a portion of the fourth product to the first stage. As may be appreciated, the second product is rich in HFE and the fourth product is rich in DCM.

In an embodiment, the invention relates to a method for recycling one or more diluents and/or solvents in the methods described above. In another embodiment, the invention relates to a method for producing a microporous polymeric membrane which is produced from any of the methods described above.

In an embodiment, the invention relates to a method for producing a battery separator including a method for removing P-sol from polymer extrudate comprising described above.

DETAILED DESCRIPTION OF THE INVENTION

[1] Preparing Polymer Extrudate

Figure 1:
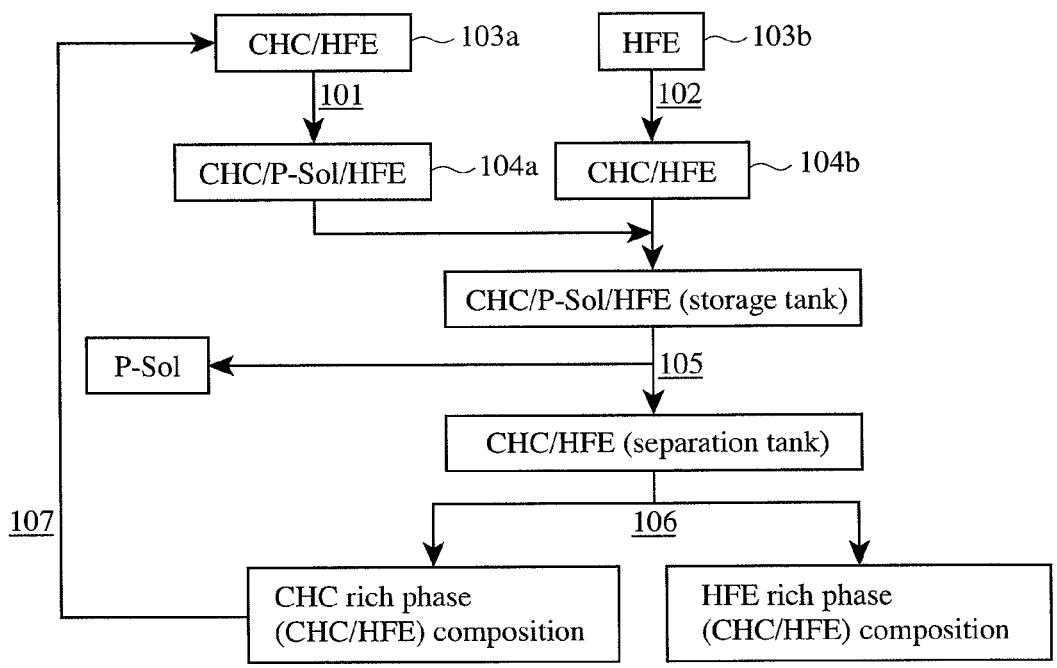
FIG. 1 schematically shows an embodiment where a porous polymeric extrudate which contains P-Sol in the extrudates pores, is contacted with a CHC-HFE mixture in a first stage, and the washed extrudate contacts HFE in a second stage to rinse residual CHC from the extrudate's pores. First and second streams containing CHC and HFE from the first and second stages respectively are combined, and the combined stream is cooled to separate a CHC-rich phase from and HFE-rich phase. The CHC-rich phase is recycled to the first stage for re-use. P-sol can be separated from the first stream or the combined stream if desired. This embodiment can be used, e.g., when a relatively small amount of HFE is used in the first stage compared to the amount of DCM.

The invention is based in part on the discovery of a method for the efficient removal of a process solvent from a polymeric extrudate by washing the extrudate with a washing solvent comprising chlorinated hydrocarbon and then rinsing the washed extrudate in a rinsing stage with a solvent comprising a fluoridated ether. The washing solvent removes at least a portion of the process solvent from the extrudate and the rinsing solvent removes at least a portion of the washing solvent. The method is advantageous in that it overcomes the problems associated with residual washing solvent in the extrudate, as in JP2002-256099 A which is incorporated by reference herein, and also in that it efficiently makes available at least a portion of the rinsing solvent for recycle to the rinsing stage, thereby obviating the need for make-up rinsing solvent. In an embodiment, the invention relates to a method for removing process solvent from polymer extrudate in a "wet" process for producing microporous membranes. The membrane is produced by extruding a polymeric solution and then processing the resulting extrudate. In order to prepare the polymeric extrudate, at least one polymer (generally in the form of a resin or mixture of resins) is combined with at least one diluent (e.g., a process solvent). See for example, PCT Patent Application WO/2007/117042, which is incorporated by reference herein. The invention is compatible with processes which produce layered microporous membranes. Such processes include, for example, coextrusion process where at least two polymeric solutions are coextruded through a die to produce a multi-layer extrudate and then subsequently processing the multi-layer extrudate to produce the multi-layer microporous membrane. Alternatively, individual microporous membranes can be produced in wet processes, which can then be laminated to form the multi-layer microporous membrane. While not limited thereto, the invention will be described in terms of the production of a microporous polyolefin membrane.

(1) Starting Material

The microporous membrane is produced from a polymeric solution. Consequently, the process involves providing a polymer resin or optionally combining two or more polymer resins and providing these to the process. The polymeric solution is produced from at least one polymer resin and at least one diluent. When the polymer resin comprises one or more polyolefin resins, the polymeric solution can be referred to as a polyolefin solution.

(A) Polyolefin Resin

In an embodiment, polyolefin resin can be at least one polyethylene (PE), polypropylene (PP), polybutene-1 (PB-1), polymethylpentene-1 (PMP). The resin can be, e.g., a homopolymer or copolymer of the desired polyolefin. The weight-average molecular weight Mw of the polyolefin is not critical, and can be in the range of about $1 \times 10^4$ to about $1 \times 10^7$, or about $1 \times 10^5$ to about $5 \times 10^6$, or about $2 \times 10^5$ to about $3 \times 10^6$. When the polyolefin is polyethylene, the Mw/Mn of the polyethylene resin is generally in the range of about 5 to about 300, or from about 5 to about 100, or from about 5 to about 30. In an embodiment, polyolefin resin can contain polyethylene, or polyethylene and polypropylene.

More than one polyolefin resin can be used to produce the polyolefin solution. For example, the polyolefin can contain resins of a first polyethylene, second polyethylene, first polypropylene, second polypropylene, etc. In an embodiment, the first polyethylene resin is a polyethylene having an Mw of less than $1 \times 10^6$, for example, a polyethylene having an Mw ranging from about $1 \times 10^4$ to about $5 \times 10^5$. Optionally, the polyethylene resin can be one or more of a high-density polyethylene resin (HDPE), a medium-density polyethylene, a branched low-density polyethylene, or a linear low-density polyethylene. Although it is not critical, the Mw of high-density polyethylene resin can range, for example, from about $1 \times 10^5$ to about $5 \times 10^5$, or from about $2 \times 10^5$ to about $4 \times 10^5$. In an embodiment, the first polyethylene is resin at least one of (i) an ethylene homopolymer or (ii) a copolymer of ethylene and a second α-olefin such as propylene, butene-1, hexene-1, etc, typically in a relatively small amount compared to the amount of ethylene. Such a copolymer can be produced using a single-site catalyst.

In an embodiment, the second polyethylene resin is a polyethylene having an Mw of at least about $1 \times 10^6$. For example, a second polyethylene resin can be an ultra-high molecular weight polyethylene ("UHMWPE"). For example, the second polyethylene resin can be at least one of (i) an ethylene homopolymer or (ii) a copolymer of ethylene and a third α-olefin which is typically present in a relatively small amount compared to the amount of ethylene. The third α-olefin can be, for example, one or more of propylene, butene-1, pentene-1, hexene-1,4-methylpentene-1, octene-1, vinyl acetate, methyl methacrylate, or styrene. Although it is not critical, the Mw of the second polyethylene can range from about $1 \times 10^6$ to about $15 \times 10^6$, or from about $1 \times 10^6$ to about $5 \times 10^6$, or from about $1 \times 10^6$ to about $3 \times 10^6$.

When the polyethylene solution is produced from both the first and second polyethylene, the amount of the second polyethylene in the polyethylene solution (based on the total weight of polyethylene in the polyolefin solution) can be, e.g., in the range of about 1 wt. % to about 99 wt. % of, although this amount is not critical.

In an embodiment, the polyethylene or the polyethylene composition further contain the second polyolefin. In an embodiment, the second polyolefin can be selected at least one of polypropylene (PP), polybutene-1, polypentene-1, poly-4-methylpentene-1, polyhexene-1, polyoctene-1, polyvinyl acetate, polymethyl methacrylate, polystyrene and an ethylene α-olefin copolymer. In an embodiment, the second polyolefin is PP.

Polypropylene resin(s) useful for forming the polyolefin solutions include, e.g., one or more of (i) a propylene homopolymer or (ii) a copolymer of propylene and a fourth olefin. The copolymer can be a random or block copolymer. The fourth olefin can be, e.g., one or more α-olefins such as ethylene, butene-1, pentene-1, hexene-1,4-methylpentene-1, octene-1, vinyl acetate, methyl methacrylate, and styrene, etc.; and diolefins such as butadiene, 1,5-hexadiene, 1,7-octadiene, 1,9-decadiene, etc. While it is not critical, the polypropylene resin can optionally have one or more of the following properties: (i) the polypropylene has an Mw in a range of about $1 \times 10^4$ to about $4 \times 10^6$, or about $3 \times 10^5$ to about $3 \times 10^6$; (ii) the polypropylene has an Mw/Mn in a range of about 1.01 to about 100, or about 1.1 to about 50; (iii) the polypropylene's tacticity is isotactic; (iv) the polypropylene has a heat of fusion of at least about 90 Joules/gram; (v) polypropylene has a melting peak (second melt) of at least about 160° C., (vi) the polypropylene has a Trouton's ratio of at least about 15 when measured at a temperature of about 230° C. and a strain rate of 25 sec$^{-1}$; and/or (vii) the polypropylene has an elongational viscosity of at least about 50,000 Pa·sec at a temperature of 230° C. and a strain rate of 25 sec$^{-1}$.

(B) Process Solvent

As long as combination of the polyolefin resin(s) and diluent can be formed into a polyolefin, the selection of diluent (or process solvent, or "P-sol") is not critical. The P-sol is preferably a solvent that is liquid at room temperature. In an embodiment, the diluent (or solvent) can be at least one of aliphatic, alicyclic or aromatic hydrocarbons such as nonane, decane, decalin, p-xylene, undecane, dodecane, liquid paraffin, etc.; mineral oil distillates having boiling points comparable to those of the above hydrocarbons; and phthalates liquid at room temperature such as dibutyl phthalate, dioctyl phthalate, etc. In an embodiment where it is desired to obtain a cooled extrudate having a stable liquid solvent content, non-volatile liquid solvents such as liquid paraffin can be used, either alone or in combination with other solvents. In an embodiment, the specific gravity of solvent is no more than 1.4, or no more than 1.3, or no more than 1.1, because the liquid solvents having a specific gravity in this range are relatively easy to recycle and reuse. Consequently, liquid paraffin can be used because the specific gravity of liquid paraffin is in the range of from about 0.83 to about 0.89.

The viscosity of the P-sol is not a critical parameter. For example, the viscosity of the liquid solvent can range from about 30 cSt to about 500 cSt, or from about 30 cSt to about 200 cSt, at 25° C. Although it is not a critical parameter, when the viscosity at 25° C. is less than about 30 cSt, it can be more difficult to prevent foaming the polyolefin solution, which can lead to difficulty in blending. On the other hand, when the viscosity is greater than about 500 cSt, it can be more difficult to remove the liquid solvent from the microporous polymer membrane.

(2) Preparing the Polyolefin Solution

The polyolefin solution can be produced by combining the polyolefin with the solvent. The method selected for preparing a solution is not critical. For example, the polymer resin(s) as described above can be combined, e.g., by melt blending, with at least one P-sol to prepare a polymer solution. The resin(s) and P-sol(s) can be added sequentially, in parallel, or in a combination thereof. The method for combining the polyolefin resin or resins and P-sol is not critical, and e.g., conventional mixing methods can be used. Optionally, the polyolefin solution can contain various additives such as one or more antioxidant, fine silicate powder (pore-forming material), etc., provided these are used in a concentration range that does not significantly degrade the desired properties of the microporous polymer membrane.

When melt-blending is used, the melt-blending temperature is not critical. For example, the temperature of the polyolefin solution during melt-blending (the melt-blending temperature) can range, e.g., from about 10° C. higher than the melting point Tm of the polyethylene resin to about 120° C. higher than Tm. For brevity, such a range can be represented as (Tm+10° C.) to (Tm+120° C.). In an embodiment where the polyethylene resin has a melting point of about 130° C. to about 140° C., the melt-blending temperature can range from about 140° C. to about 250° C., or from about 170° C. to about 240° C. The melting point is measured by differential scanning calorimetry (DSC) according to JIS K7121.

When an extruder such as a double-screw extruder is used for melt-blending, the screw parameters are not critical. For example, the screw can be characterized by a ratio L/D of the screw length L to the screw diameter D in the double-screw extruder, which can range, for example, from about 20 to about 100, or from about 35 to about 70. Although this parameter is not critical, when L/D is less than about 20, melt-blending can be more difficult, and when L/D is more than about 100, faster extruder speeds might be needed to prevent excessive residence time of the polyolefin solution in the double-screw extruder (which can lead to undesirable molecular weight degradation). Although it is not a critical parameter, the cylinder (or bore) of the double-screw extruder can have an inner diameter of in the range of about 40 mm to about 100 mm, for example.

The amount of the polyolefin composition in the polyolefin solution is not critical. In an embodiment, the amount of polyolefin composition in the polyolefin solution can range from about 1 wt. % to about 75 wt. %, based on the weight of the polyolefin solution, for example from about 20 wt. % to about 70 wt. %. Although the amount of polyolefin composition in the polyolefin solution is not critical, when the amount is less than about 1 wt. %, it can be more difficult to produce the microporous polyolefin membrane at an acceptably efficient rate. Moreover, when the amount is less than 1 wt. %, it can be more difficult to prevent swelling or neck-in at the die exit during extrusion, which can make it more difficult to form and support the cooled polymer extrudate. On the other hand, when the amount of polyolefin composition solution is greater than about 75 wt. %, it can be more difficult to form the cooled polymer extrudate.

(3) Extruding the Polyolefin Solution and Optionally Cooling the Extrudate

The polyolefin solution can be extruded to form the extrudate. The extrudate is further processed to form the microporous membrane.

In an embodiment, at least a portion of the polyolefin solution is extruded through at least one die in order to form an extrudate. For example, the polyolefin solution can be extruded and then conducted directly from a first extruder to the die. In an alternative embodiment, additional extruders (second, third, etc.) can be used. The additional extruders can be connected in series and/or parallel with the first extruder. The product of the first extruder can be cooled and then pelletized. Subsequently, the pellets can be, e.g., melt-blended and extruded through a second extruder and a die to make the gel-like molding or sheet. The selection of die geometry is not critical. For example, the die can be a sheet-forming die having a rectangular orifice, a double-cylindrical, hollow die, an inflation die, etc. The die gap is not critical. In the case of a sheet-forming die, the die generally has a gap of about 0.1 mm to about 5 mm. The temperature of the polyolefin solution during extrusion (the extrusion temperature) is not critical, and generally ranges from about 140° C. to about 250° C. The extruding speed is not critical, and generally ranges from about 0.2 m/minute to about 15 m/minute.

If desired, the extrudate can be cooled to form a cooled extrudate. Cooling can be conducted until the polyolefin extrudate reaches the extrudate's gelation temperature (i.e., the temperature at which the polymer extrudate sheet begins to gel) at a cooling rate of at least about 50° C./minute. In an embodiment, the polyolefin extrudate is cooled to a temperature of about 25° C. or lower.

(4) Optionally Stretching the Extrudate

If desired, the cooled polymer extrudate which is generally in the form of a gel-like molding or sheet can be stretched in at least one planar direction (i.e., a direction in the plane of the extrudate) to form a stretched sheet. This step is optional. Neither the choice of stretching method nor the degree of stretching magnification are particularly critical. While the choice is not critical, the stretching can be conducted monoaxially or biaxially. Monoaxial stretching involves stretching the cooled polymer extrudate in one planar direction, e.g., either the machine (i.e., longitudinal) direction or the transverse direction. Biaxial stretching involves stretching the cooled polymer extrudate in two planar directions, e.g., both the machine direction and transverse direction. In this context, the machine direction is a direction in the plane of the film (the cooled polymer extrudate in this instance) which is oriented approximately along the direction of travel as the film is formed, i.e., the longest axis of the film during production. The transverse direction also lies in the plane of the film and is approximately perpendicular to both the machine direction and a third axis approximately parallel to the thickness of the film.

Though not critical, the temperature of the cooled polymer extrudate during stretching (the "stretching temperature") can be about (Tm+10° C.) or lower. Optionally, the stretching temperature is in a range that is higher than Tcd but lower than Tm, wherein Tm is the melting point and Tcd is the crystal dispersion temperature of the polyolefin used to make the polyolefin solution. In an embodiment, when using polyethylene single component or polyethylene containing composition as a polymer, the stretching temperature ranges from about 90° C. to about 140° C., or about 100° C. to about 130° C.

The second polyethylene, and the combined first and second polyethylene composition generally have a Tm of about 130° C. to 140° C. and Tcd of about 90° C. to 100° C. Tcd can be determined from the temperature characteristics of the kinetic viscoelasticity measured according to ASTM D-4065.

Optionally, stretching can be conducted in the presence of a temperature gradient in a thickness direction (i.e., a direction approximately perpendicular to the planar surface of the microporous polyolefin membrane) as described in JP3347854 B2.

[2] Removing the Diluent from the Extrudate to Form the Microporous Membrane

In an embodiment, the following steps are used for removing the P-sol from the extrudate. In the first step, called step (A), the extrudate contacts hydrofluoroether(s) (HFE) and chlorinated hydrocarbon(s) (CHC) in a first stage to remove at least a portion of a P-sol from the extrudate's pores. A first stream comprising P-sol, HFE, and CHC, is conducted away from the first stage to prevent accumulation of P-sol in the CHC/HFE mixture used in the first stage. While a mixture of HFE and CHC can be used to remove P-sol from the extrudate's pores, the washing solvents of the first stage are not limited thereto. Any washing solvent mixture effective for removing P-sol from the extrudates pores can be used provided the mixture of washing solvents has a "UCST (Upper Critical Solution Temperature)"-type phase diagram.

In a second step, called step (B), the extrudate from step (A) contacts HFE in a second stage to remove at least a portion of any residual CHC from the extrudate. A second stream comprising HFE and CHC is conducted away from the second stage to prevent accumulation of CHC in the second stage.

In an embodiment, in Step (D), the first and second streams can be combined, and the P-sol can be separated from the combined streams. Alternatively, the P-sol can be separated from the first stream with the remaining CHC/HFE after P-sol separation available for storage, further processing, or conducting to the first stage for recycle and re-use. In either case, the P-sol is available for recycle and re-use to produce the polyolefin solution. The first and/or second streams alone or in combination can be conducted to Step (E) for CHC-HFE separation.

In Step (E) cooling the selected HFE-CHC stream from Step (D) is cooled to make an HFE-rich phase and a CHC-rich phase. The amount of cooling is selected to provide the desired concentration of HFE in the HFE-rich phase and the desired concentration of CHC in the CHC-rich phase. For example, in one embodiment relating to a continuous process for producing a microporous membrane, the amount of cooling of the combined first and second streams is selected to provide (I) a CHC-rich phase containing at least as high a CHC content as in the first stream and/or (II) an HFE-rich phase having at least as high an HFE content as in the second stream. Depending on the HFE content of the CHC-HFE mixture used to remove the P-sol from the extrudate in the first stage, it can be desirable to recycle the HFE-rich phase (with or without additional HFE purification) to the first stage. Similarly, the CHC-rich phase can be purified, and a relatively pure CHC recycled to the first stage for re-use when a relatively high concentration of CHC is desired for the first stage. Accordingly, the process can further comprise at least one step (F) selected from the group of the following (a)-(d):

(a) conducting the CHC-rich phase from step (E) to step (A);

(b) conducting the HFE-rich phase from step (E) to steps (A) or (B);

(c) (i) separating a first and second product, from the CHC-rich phase of Step (E) wherein the first product comprises relatively pure CHC and the second product comprises at least a portion of the remainder of the CHC-rich phase of Step (E) following separation of the first product, and then carrying out the steps of (c) (ii) and/or (c)(iii)

(ii) conducting the first product to step (A),
  (iii) conducting the second product to at least one of Step (A), Step (B), or Step (E);

(d) (i) separating a third and fourth product from the HFE-rich phase of Step (E) wherein the third product comprises relatively pure HFE and the fourth product comprises at least a portion of the remainder of the HFE-rich phase of Step (E) following separation of the third product, and then carrying out the steps of (d)(ii) and/or (d)(iii)

(ii) conducting the third product to step (A) and/or (B),
  (iii) conducting the fourth product to steps (A) or (E).

As may be appreciated, the second and fourth products can be an azeotropic mixture of DCM and FIFE, which can be recycled to extinction in Step (E).

In an embodiment, the process can further comprise the following step; (C) optionally drying the extrudate to remove at least some of the FIFE between steps (B) and (E).

By way of exemplification, the following ten embodiments describe how the P-sol removal step of the invention can be integrated in various forms into a wet process for producing a microporous membrane. Since each of the ten embodiments begins by conducting Steps (A) through (E) as described above, steps (F) will be described in detail for each case.

(1) First Method of Removing a Process Solvent

In a first embodiment, Steps (A) through (E) are conducted as set out in the preceding section in order to produce a CHC-rich phase and an HFE-rich phase. Step (F) as described below follows Step (E). Step (F) conducting the CHC-rich phase from Step (E) to step (A) for use as the washing solvent, as described above as Step (F) (a).

This first method, shown schematically in FIG. 1., involves recycling the CHC-rich phase which comprises (HFE and CHC) from the cooling step to the first washing step. 101 is a washing step, and 102 is a rinsing step. 103a, 103b shows solvents, and 104 shows effluent streams conducted from each step of 101 and 102. 105 is distillation step in order to obtain a purified P-sol. 106 is a cooling separation step in order to obtain a CHC-rich phase and an HFE-rich phase.

In an embodiment, at least a portion of the P-sol is removed (or displaced) from the stretched polymer extrudate or the polymer extrudate in the first stage (also called the "washing stage") by a mixture of CHC and HFE in order to form a solvent-removed polymer extrudate. In other words, in the first stage, at least a portion of the P-sol is removed from the extrudate, generally from the pores of the extrudate. The mixture of CHC and HFE (also called a "second solvent" or "washing" solvent to distinguish it from the P-sol) can be any mixture of CHC and HFE (including an azeotrope of HFE and CHC) which is capable of removing (or washing away, or displacing) a portion of the P-sol from the extrudate. The washed extrudate is then conducted to a second stage (also called a rinsing stage) where a portion of the residual CHC (if any is present) is removed from the extrudate by contacting the washed extrudate with a third solvent (also called a "rinsing" solvent). The washing step (Step (A)); the rinsing step (Step (B)); and Steps (C), (D), (E), and (F) all of which relate to concentrating and recycling CHC and HFE individually or in combination, will now be described in more detail.

(A) A Washing Step

The washing step comprises contacting the polymer extrudate with one or more hydrofluoroether(s) (HFE) and one or more chlorinated hydrocarbon(s) (CHC) to remove at least a portion of the P-sol from the polymer extrudate. In FIG. 1, 101 is a washing step, and 103a means a solvent conducted to the washing step. In part to prevent the accumulation of P-sol in the washing solvent, a first effluent (also called a first stream or first effluent stream) comprising P-sol, HFE, and CHC is conducted away from Step (A). Since a portion of the washing solvent is conducted away from the washing stage, fresh or recycled HFE and CHC are conducted to the washing step to replenish the CHC-HFE washing solvent. Since a mixture of HFE and CHC has a UCST phase diagram, the CHC and HFE in the washing step's effluent can be separated into an HFE-rich phase and a CHC-rich phase by cooling as described in the discussion of Step (E). The washing solvent can contain one or more HFE species and one or more CHC species, and the choice of HFE and CHC species is not critical provided the CHC-HFE mixture can form an azeotropic composition. An azeotropic composition of HFE and CHC (e.g., an azeotrope consisting of or consisting essentially of one CHC species and one HFE species) is particularly effective for removing P-sol like liquid paraffin for the extrudate, and, consequently, the first washing solvent is an azeotrope of at least one FIFE species and at least one CHC species, In an embodiment, the chlorinated hydrocarbons can be dichloromethane (DCM), trichloromethane, tetrachloromethane, 1,1-dichloroethane, 1,2-dichloroethane, trichloroethane, and thereof. In an embodiment, the hydrofluoroethers can be $C_4F_9OC_2H_5$ and $C_6F_{13}OCH_3$, and thereof. In a preferable embodiment, the chlorinated hydrocarbons can be dichloromethane, and the hydrofluoroethers can be $C_4F_9OCH_3$.

Figure 2A:
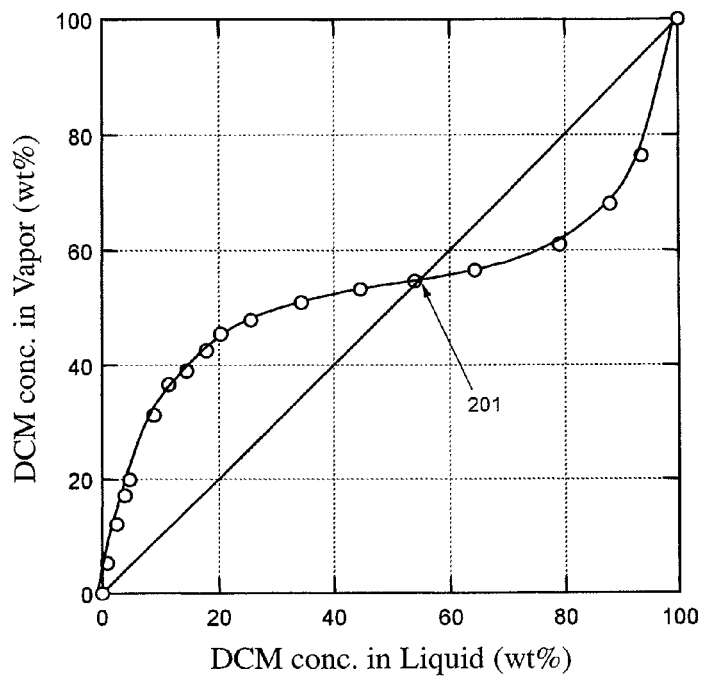
FIG. 2 (a) shows the Vapor-Liquid Equilibrium Diagram for a binary mixture of $DCM/C_4F_9OCH_3$ measured at 101.8 kPa.
FIG. 2(b) shows the boiling point of the azeotrope containing significant amounts of DCM and HFE.
Figure 2B:
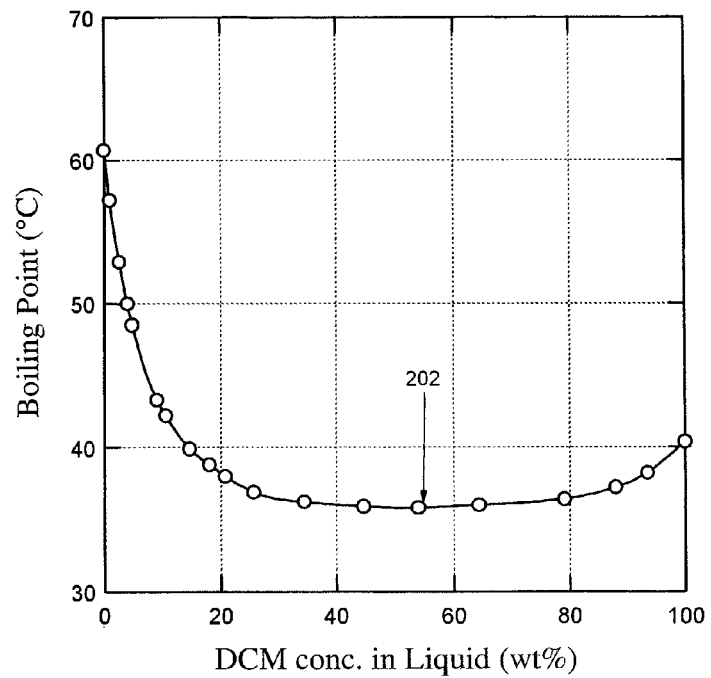
Figure 3:
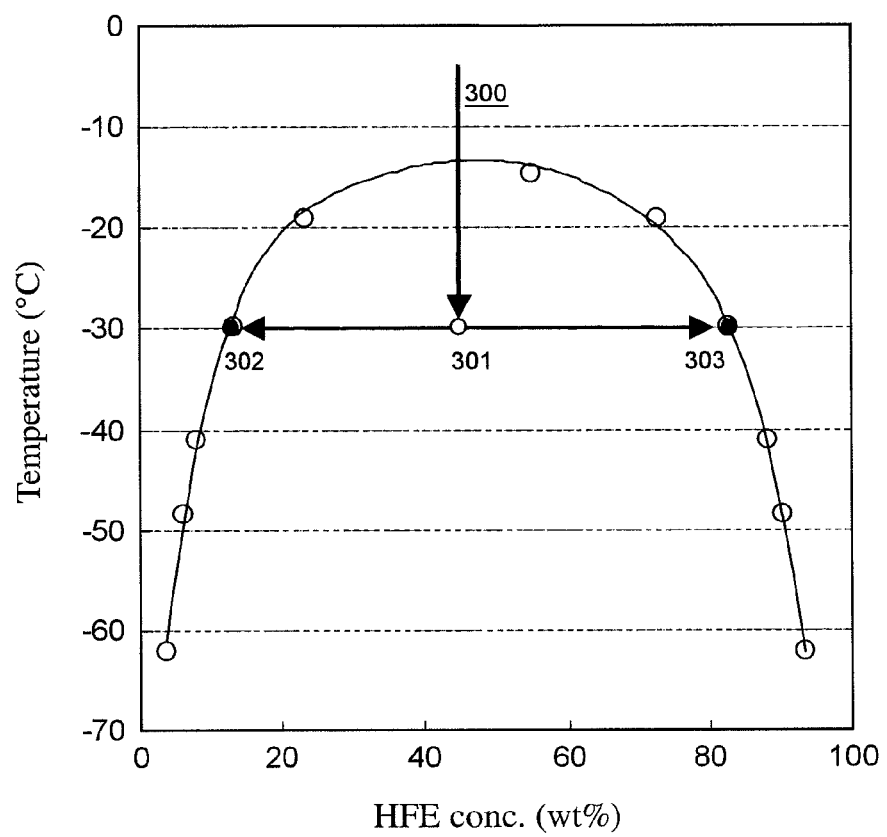
FIG. 3 shows the Phase Diagram of a binary mixture of $DCM/C_4F_9OCH_3$, and shows how the azeotrope (or any other isotropic mixture) of $DCM/C_4F_9OCH_3$ can be broken down into a portion rich in DCM and a portion rich in $C_4F_9OCH_3$.

For example, the composition of dichloromethane (DCM) and $C_4F_9OCH_3$ (HFE7100 (trade mark of 3M)) forms an azeotropic composition 201 and 202, as shown in FIG. 2. The composition of 54.8 wt. % of DCM and 45.2 wt. % of $C_4F_9OCH_3$ on the basis of total volume of DCM and $C_4F_9OCH_3$, has an azeotropic boiling point of 35.8° C. Accordingly, 54.8 wt. % of DCM and 45.2 wt. % of $C_4F_9OCH_3$ on the basis of total weight of DCM and $C_4F_9OCH_3$ is most preferable composition. As shown in FIG. 3, the composition can be characterized by UCST diagram, i.e., one exhibiting an upper critical solution temperature or "UCST". When a solvent composition is characterized by an UCST phase diagram, the composition is homogeneous at a relative higher temperature, and the composition separates two phases at a relative lower temperature. Consequently, when the composition is cooled to a relative lower temperature, the composition separates two phases. In the case of FIG. 3, when the composition 301 of DCM and $C_4F_9OCH_3$ is cooled to lower than about −15° C., the composition separates into the DCM rich phase and $C_4F_9OCH_3$-rich phase. For example, when the composition 301 of DCM and $C_4F_9OCH_3$ is cooled to −30° C., the composition separates into the DCM rich phase 302 and $C_4F_9OCH_3$-rich phase 303. In an embodiment, the chlorinated hydrocarbons and hydrofluoroethers can have a boiling point in the range of from about 30° C. to about 95° C., which is a convenient range or use of the washing solvent in the washing step.

The method of contacting the polymer extrudate with the washing solvent (i.e., washing the P-sol) is not critical. Any method capable of removing a significant amount of P-sol can be used, including conventional solvent-removal methods. For example, the polymer extrudate can be washed by immersing the sheet in the washing solvent and/or showering the sheet with the washing solvent. Although times of contacting the polymer extrudate are not critical, times of contacting the polymer extrudate with the washing solvent are at least 1, or preferably at least 2, or most preferably at least 3. In an embodiment, to improve the rate of replacing the P-sol (e.g., liquid paraffin) into a washing solvent, the times are at least 3. When a significant amount of P-sol remains in the washed polymer extrudate, it can be more difficult to remove P-sol in a rinsing step hereinafter. Consequently, it can be more difficult to produce a membrane of the desired porosity. Consequently, if reduced porosity is observed, additional washing cycle should be conducted until the remaining P-sol is removed.

After contacting the polymer extrudate (i.e., washing the P-sol), the washing step's effluent of P-sol, HFE and CHC (i.e., the first stream) can optionally be collected in the first storage region. For example, a vessel (or tank) is suitable for storing the washing step's effluent. A tank used for storing the washing stage's effluent can be called a "first tank".

Although it is not necessary to do so, before contacting the polymer extrudate with the washing solvent, the polymer extrudate can be conducted to contact at least one first sealing solvent. This step is defined as a "first sealing step". The first sealing step is optional. Contacting the polymer extrudate with at least one first sealing solvent can be used to prevent the release of washing solvent vapor into the air. The first sealing solvent, when used, should be immiscible with the P-sol to reduce the risk releasing a portion of the washing solvent into the air. Although it is not necessary, the first sealing solvent can be immiscible with the washing solvent, e.g., the first sealing solvent can have a solubility amount of no more than 5 wt. % for the washing solvent, or no more than 4 wt. % for the washing solvent. In an embodiment, a density of the first sealing solvent can be lighter than that of the washing solvent, although it is not critical. In an embodiment, the first sealing solvent can be water, N,N-dimethylformamide, or mixtures thereof.

(B) A Rinsing Step

A rinsing step comprises contacting the washed polymer extrudate from Step (A) with HFE to remove at least a portion of the CHC from the polymer extrudate and forming a second waste stream of HFE and CHC. In FIG. 1, 102 is a rinsing step, and 103b shows a solvent conducted to the rinsing step.

In an embodiment, HFE can be used as a rinsing solvent in the rinsing step. In an embodiment, the hydrofluoroethers can be $C_4F_9OCH_3$, $C_4F_9OC_2H_5$ and $C_6F_{13}OCH_3$, and their mixtures. The method of contacting the polymer extrudate from Step (A) with HFE is not critical as long at least a portion of any remaining CHC is removed from the polymer extrudate. Any method capable of removing a significant amount of CHC can be used, including conventional solvent-removal methods.

For example, the washed polymer extrudate or stretched-washed polymer extrudate can be rinsed by immersing the sheet in the rinsing solvent and/or showering the sheet with the rinsing solvent. When a significant amount of P-sol and CHC remains in the washed polymer extrudate or stretched-washed polymer extrudate after the rinsing step, it can be more difficult to produce a membrane of the desired porosity. Consequently, in one embodiment P-sol and CHC can be removed from the rinsed polymer extrudate until the amount of the P-sol and CHC in the rinsed polymer extrudate becomes less than 1 wt. %, based on the weight of the rinsed polymer extrudate. It might be appreciated that the relative amount of HFE in the rinsed polymer extrudate is not significant feature of the process because HFE can be easily removed by a subsequent drying step since HFE is quite volatile.

In part to prevent the accumulation of CHC in the rinsing solvent, an effluent stream of HFE and CHC is conducted away from the rinsing stage. This effluent stream is referred to as the second stream or second effluent stream to distinguish it from the washing stage's effluent stream. The second stream comprises HFE and CHC. In an embodiment, the second stream is conducted to, and collected in, a second storage region, which, like the first storage region, can be, e.g., a tank or vessel. When a tank is used as the second storage region, it is referred to as the "second tank" to distinguish it from the first tank used to store the first stream.

(C) Drying the Polymer Extrudate to Remove at Least Some of the HFE (Optional Step)

After contacting the washed polymer extrudate, drying the polymer extrudate to remove at least some of the HFE. This step is optional. The polymer extrudate can be dried by any method capable of removing at least some of the HFE in order to form a dried sheet. For example, the washed polymer extrudate can be dried by a heat-drying method, a wind-drying (moving air) method, etc. The drying temperature is not critical, and can be, e.g., equal to or lower than the above Tcd, or optionally 5° C. or more lower than the Tcd (ASTM D-4065). For example, UHMWPE or a polyethylene composition of UHMWPE and HDPE generally has crystal dispersion temperatures in the range of about 90 to about 100° C. After drying the polymer extrudate to remove at least some of the HFE, the dried polymer extrudate can be converted into a microporous polymer membrane. Drying is conducted until the remaining washing solvent (and/or) rising solvent becomes preferably 5 wt. % or less, more preferably 3 wt. % or less, per on the basis of 100 wt. % of the microporous polymer membrane.

After drying the polymer extrudate to remove some of the FIFE rinsing solvent, the dried polymer extrudate can be contacted with at least one second sealing solvent to prevent releasing vapors of the washing solvent and rinsing solvent into the air. This step is optional, but when used it is called a "second sealing step". While in an embodiment the second sealing solvent is immiscible with the washing solvent and rinsing solvent, this is not required. For example, in one embodiment the second sealing solvent has a solubility amount of no more than 5 wt. % in the washing solvent and/or rinsing solvent, or no more than 4 wt. % for the washing solvent and/or rinsing solvent. In an embodiment, a density of the second sealing solvent can be lighter than that of the washing solvent, although it is not critical. In an embodiment, the second sealing solvent can be water, $C_4F_9OCH_3$, $C_4F_9OC_2H_5$, N,N-dimethylformamide (DMF) or thereof, although the second sealing solvent depends on what kind of washing solvent is used.

It can be advantageous to provide additional vapor barriers between the washing stage, the rinsing stage, and stages upstream of the washing stage and downstream of the rinsing stage. For example, it can be advantageous to contact the rinsed polymer extrudate with at least one third sealing solvent. The third sealing solvent when used should have similar properties to the first and second sealing solvent, although it can be independently selected. In an embodiment, the third sealing solvent can be water, $C_4F_9OCH_3$, $C_4F_9OC_2H_5$, N,N-dimethylformamide (DMF), or mixtures thereof, although the third sealing solvent depends on what kind of washing solvent is used.

In an embodiment, in order to complete preventing from exposing vapor of the washing solvent or rinsing solvent to that air, the polymer extrudate can be conducted to the first, second and third sealing step. In another embodiment, in order to complete preventing from exposing vapor of the washing solvent or rinsing solvent to that air, the first, second and third sealing step can be conducted in a closed system.

(D) Combining the First and Second Waste Streams and then Separating the P-Sol from the Combined Streams to Make an HFE-CHC Stream;

Following Steps (A) and (B), the first and second streams are combined and then P-sol is separated from the combined streams to make an HFE-CHC stream. In FIG. 1, 104 shows effluent streams of each of the washing step and rinsing step. In other words, after conducting step (A), an effluent stream comprises a CHC, P-Sol and HFE composition, and after conducting step (B), a second effluent stream comprises a CHC and HFE composition. The method selected for combining the first and second waste streams is not critical. The method selected for separating the P-sol from the combined streams to make an HFE-CHC stream is not critical. In an embodiment, when using a liquid paraffin as a P-sol, fractional distillation (105 in FIG. 1) of the combined streams can be used for the separation because an HFE and a CHC has lower boiling point than a P-sol (e.g., liquid paraffin boiling point: greater than 200° C.). Since HFE and CHC are relatively easy to boil, a residue liquid after distillation of the combined stream is primarily P-Sol (e.g., a liquid paraffin). When using liquid paraffin as a P-sol, DCM as CHC, and $C_4F_9OCH_3$ as HFE, the fractional distillation temperature can be from 40° C. to 90° C. at atmospheric pressure. While fractional distillation can be used to separate P-sol, it can be difficult to separate the HFE-CHC stream by distillation, since CHC and HFE form an azeotrope containing a significant amount of CHC and FIFE which cannot be broken down by fractional distillation. As shown in FIG. 2, the composition of DCM/$C_4F_9OCH_3$ has a unique boiling point in the range of all ratio of DCM/$C_4F_9OCH_3$ compositions.

While the P-sol can be separated from the combined streams by using difference of the specific gravity, this might not be advantageous when the P-sol is a liquid paraffin because the P-sol is miscible in the combined HFE-CHC streams. Separated P-sol is conducted away from Step (D), and is available, e.g., for storage or recycle and re-use in forming polyolefin solution. Following P-sol separation, the combined first and second streams are referred to as a third stream. The third stream is then conducted to the cooling step, Step (E).

(E) Cooling the Third Stream, which Comprises HFE and CHC to Make an HFE-Rich Phase and a CHC-Rich Phase In FIG. 1, 106 is a phase separation step in order to make an HFE-rich phase and a CHC-rich phase. The boiling point and gravity of HFE and CHC are very close, and the HFE and CHC in the third stream can form an azeotropic composition, as shown in FIG. 2. For example, when the composition of the third stream is 30 to 70 vol % of HFE and 30 to 70 vol % of CHC based on the total volume of the third stream, fractional distillation of the third stream cannot be used to separate a CHC-rich or HFE-rich streams from the third stream. To overcome this difficulty, use is made of the fact that the composition of HFE-CHC has a UCST phase diagram. For example, as shown in FIG. 3, the composition of HFE-CHC (e.g., $C_4F_9OCH_3$/DCM composition) has a UCST of about −14° C. Consequently, it is relatively straightforward to separate a HFE-rich phase 303 and a CHC-rich phase 302 from the third stream 301 by cooling (300) at the third stream to a temperature of no more than about −14° C., or to a temperature in the range of from about −20° C. to about −50° C. For example, as shown in FIG. 3, in case of using HFE-CHC azeotropic composition 301, the composition separates HFE-rich phase 303 (content of HFE; 85 wt. %) and CHC-rich phase 302 (content of HFE; 15 wt. %) by cooling (300) at the temperature of −30° C. The cooling temperature can be adjusted to the temperature so that either the composition of the HFE-rich phase or the composition of the CHC-rich phase is the same as the composition of the washing solvent. In this case, either the HFE-rich phase or the CHC-rich phase can be conducted to step (A) without adjusting the composition of the phase, thereby reducing the need for expensive "make-up" washing solvent that would otherwise have to be conducted to Step (A) to replace washing solvent conducted away with the first stream. In other words, when the washing solvent comprises (or consists of or consists essentially of) of about 85 wt. % of DCM and about 15 wt. % of $C_4F_9OCH_3$, the cooling temperature can be adjusted to −30° C., since DCM-rich phase is the same composition as the washing solvent. If the washing solvent comprises greater than about 85 wt. % of DCM, the cooling temperature can be adjusted into the range of about −30° C., to about −50° C. If the washing solvent has a composition in the range of about 50 wt % to about 85 wt. % of DCM based on the weight of the washing solvent, the cooling temperature can be in the range of about −15° C. to about −30° C. The minimum cooling temperature is generally −50° C. or warmer for a third stream comprising DCM and $C_4F_9OCH_3$.

The cooling method selected for Step (E) is not critical as long as the phase separation of the HFE-CHC stream occurs. Conventional cooling methods can be used in this step. For example, a conventional freezing machine or a conventional refrigerator can be used. The choice of cooling media is not critical. In an embodiment, in case cooling the HFE-CHC stream at the temperature in the range of no less than −30° C., ammonium, 2-methylpropane or carbon dioxide can be used as a cooling media. In an embodiment, in case cooling the HFE-CHC stream at the temperature in the range of below −30° C., liquid nitrogen or liquid argon can be used as a cooling media.

The HFE-rich phase and the CHC-rich phase can be, e.g., conducted away from the process, further processed (e.g., further purified), recycled for re-use in the process, or stored. When the HFE-rich phase and the CHC-rich phase are stored, any convenient method can be used, e.g., a fourth tank or vessel for the HFE-rich phase and a fifth tank or vessel for the CHC-rich phase. In this case, since specific gravity of HFE is heavier than that of CHC, the HFE-rich stream forms a lower stream, and the CHC-rich stream forms an upper stream. Consequently, the lower stream passes through the pipe line to the fourth tank, and the upper stream passes through the pipe line to the fifth tank.

(F) Conducting the CHC-Rich Phase to Step (A)

After cooling the HFE-CHC stream to make an HFE-rich phase and a CHC-rich phase, the CHC-rich phase can be conducted to Step (A), i.e., the first stage (also called the washing stage). In FIG. 1, 107 is a step for conducting the CHC-rich phase to step (A). The CHC-rich phase comprises CHC and HFE. Consequently, the CHC-rich phase can be recycled for reuse as a washing solvent. Even if the composition of the CHC-rich phase is different from that of the washing solvent, the composition of the CHC-rich phase can recycled for reuse as the washing solvent by adding "make-up" CHC or HFE in order to adjust the composition to the washing solvent. Consequently, further purification of the CHC-rich phase is not necessary but is optional.

The method for conducting the CHC-rich phase to step (A) is not critical. In an embodiment, the fifth tank is conducted to a sixth tank or a washing solvent bath. For example, when the composition of the CHC-rich phase is the same as that of the washing solvent, the fifth tank can be directly conducted to the washing solvent bath. Consequently, the CHC-rich phase can be efficiently recycled as a reused washing solvent. For example, when the composition of the CHC-rich phase is not the same as that of the washing solvent, the CHC-rich phase can be conducted to the sixth tank, and then the CHC-rich phase and "make-up" CHC (and/or) HFE can be combined with the CHC-rich phase in order to adjust the composition of the washing solvent, and then the adjusted CHC-rich phase can be conducted to the washing solvent bath. Consequently, in this case, the CHC-rich phase also can be efficiently recycled and reused as a washing solvent.

(2) Second Method of Removing a Process Solvent

Figure 4:
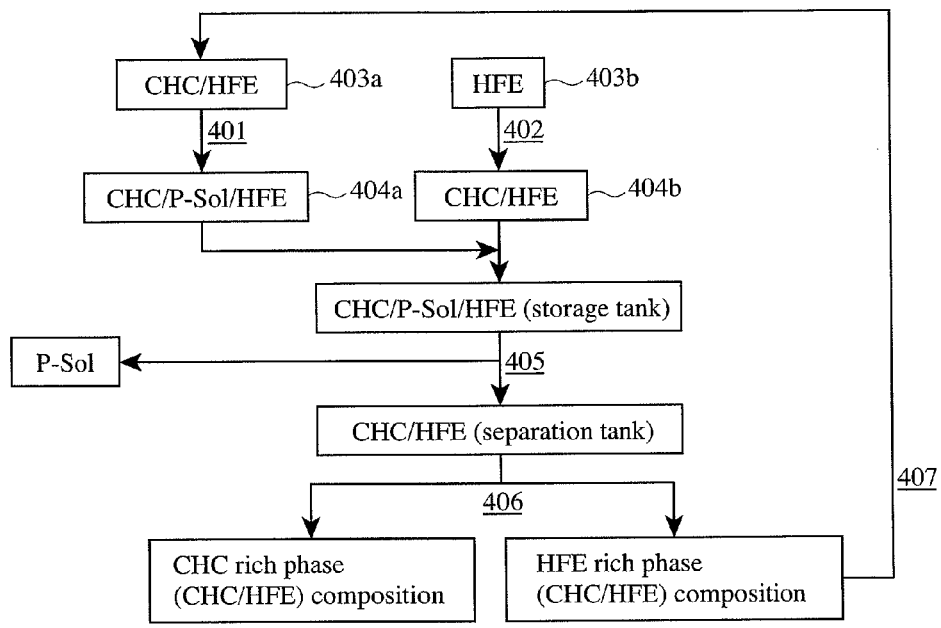
FIG. 4 schematically shows a process similar to the one illustrated in FIG. 1 except that following cooling the HFE-rich phase in the process of FIG. 4 is conducted to the first stage instead of the DCM-rich phase. This embodiment can be used, e.g., when a relatively large amount of HFE is used in the first stage compared to the amount of DCM.

In another embodiment, the invention relates to a second method for removing diluent from a polymer extrudate. Steps A through E are the same as the steps described above for the first method. The second method differs from the first method in Step (F), where the FIFE-rich phase from Step (E) is conducted to step (A), instead of the CHC-rich phase as in the first method. As shown in FIG. 4, the HFE-rich phase can be recycled as a mixture of HFE and CHC. The numbering of 401 to 406 in FIG. 4 falls is analogous to that of 101 to 106 in FIG. 1. Step (F) of the second method will now be described in more detail.

The HFE-rich phase is conducted away from the cooling step (Step (E)), e.g., as a recycle stream to step (A). In FIG. 4, 407 is a step for conducted away from the cooling step. Since the HFE-rich phase contains CHC and HFE, it can be recycled for reuse in the washing stage, with additional "make-up" CHC or HFE added to adjust the concentration of the recycle stream until it is similar to or the same as the CHC-HFE mixture used in the washing stage.

A method for conducting the HFE-rich phase to step (A) is not critical. For example, the HFE-rich phase can be conducted from the fourth tank (as described above for the first method) to a seventh tank (for storage) or to the washing solvent bath of Stage (A). For example, in case the composition of the HFE-rich phase is the same as the one of the washing solvent, the fourth tank can be directly conducted to the washing solvent bath. Consequently, the HFE-rich phase can be efficiently recycled as a reused washing solvent. The process conditions for step (E) of the second method are selected in a similar way as the process conditions of Step (E) in the first method. For example, when the washing solvent of Step (A) comprises about 83 wt. % of HFE and about 17 wt. % of DCM, the cooling temperature in step (E) can be −30° C., since the HFE-rich phase would then be the same composition as the washing solvent. Consequently, when the washing solvent comprises more than about 83 wt. % of HFE, the cooling temperature in step (E) can be less than −30° C., and when the washing solvent is comprises about 50 wt. % to about 83 wt. % of HFE, the cooling temperature in step (E) can be in the range of −14° C. to −30° C.

(3) Third Method of Removing a Process Solvent

Figure 5:
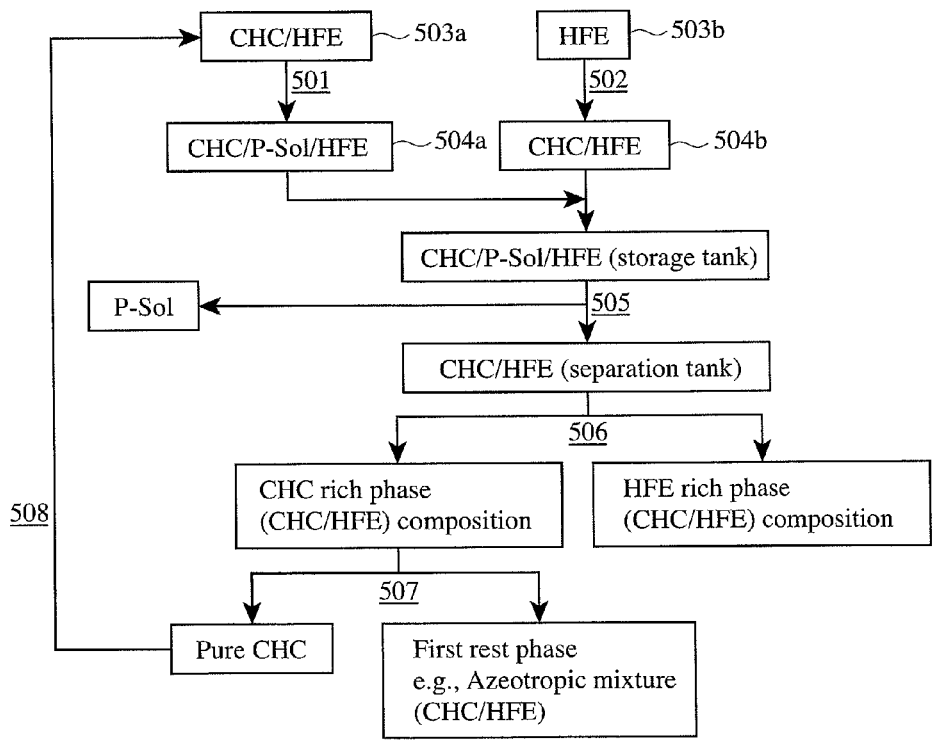
FIG. 5 schematically shows an embodiment similar to the embodiment of FIG. 1 except that following cooling a first product (comprising relatively pure CHC) and a second product are separated from the CHC-rich phase.
Figure 6:
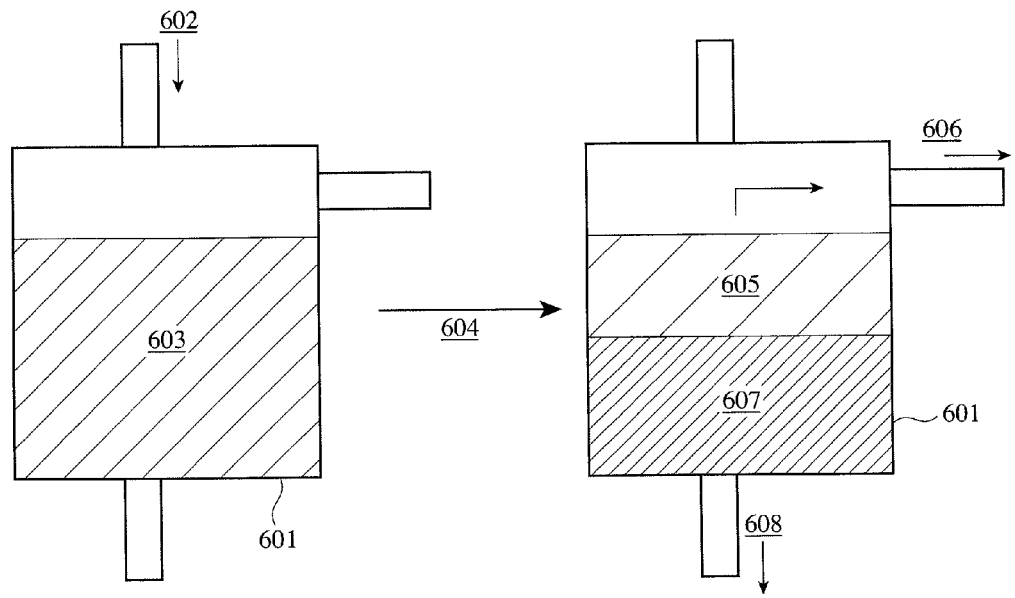
FIG. 6 schematically shows an embodiment where the CHC-rich phase is conducted away from the cooling step to a purification region where the CHC-rich phase is heated to separate the first product (purified CHC) and the second product from the CHC-rich phase.

In another embodiment, the invention relates to a third method for removing diluent from a polymer extrudate. Steps (A) through (E) are the same as the steps described above for the first method. The third method differs from the first method in Step (F). As shown in FIG. 5, third method involves recycling purified CHC to the washing solvent of Step (A). The numbering of 501 to 506 in FIG. 5 is analogous to that of 101 to 106 in FIG. 1. Step (F) of the third method will now be described in more detail. After cooling the HFE-CHC stream of Strep (E) to make an HFE-rich phase and a CHC-rich phase, a first and second product are separated from the CHC-rich phase. This step is shown as 507 in FIG. 5. The first product comprises CHC (or consists of or consists essentially of CHC), and is preferably substantially pure CHC. The second product is generally an azeotrope of CHC and HFE. The method selected for separating the first and second products from CHC-rich phase is not critical, as long as the first product contains a major amount of CHC, preferably substantially pure CHC. In this context, substantially pure means 95 wt. % CHC or purer. In an embodiment, the first product and second product are obtained from the CHC-rich stream as shown in FIG. 6. As shown that figure, the CHC-rich phase 602 can be conducted to a separation tank 601. The CHC-rich phase 603 is then heated (604) in order to a temperature in the range of from about boiling point of azeotropic composition to about the boiling temperature of a pure CHC. For example, when used DCM/$C_4F_9OCH_3$ as a washing solvent, and $C_4F_9OCH_3$ as a rinsing solvent, the CHC-rich phase is heated to a temperature in the range of about 35.8° C. to about 40° C. When the CHC-rich phase 603 is heated to a temperature in this range, a vapor of a CHC-HFE azeotropic composition 605 (the second product) can be removed as an overhead vapor stream 606 from the separation tank, and a purified CHC stream 607 (the first product) can be conducted away as a liquid stream 608 from a lower region of the separation tank. After removing the vapor from the upper stream, the purified CHC 608 obtained from the lower stream (i.e., the first product) can be conducted to Step (A) for use as, e.g., CHC make-up for the washing solvent. This step shows as 508 in FIG. 5. In other words, the purified CHC from the first product can be combined with HFE make-up to make the washing solvent, and the combined CHC and HFE can then be conducted to Step (A). Consequently, the purified CHC can be efficiently recycled as a part of a reused washing solvent. When the washing solvent of Step (A) is an azeotrope of CHC and HFE, it can be desirable to conduct the second product to Step (A) instead of the first product (or in addition to the first product when HFE can be added). This embodiment is referred to as the Fifth Method.

(4) Fourth Method of Removing a Process Solvent

Figure 7:
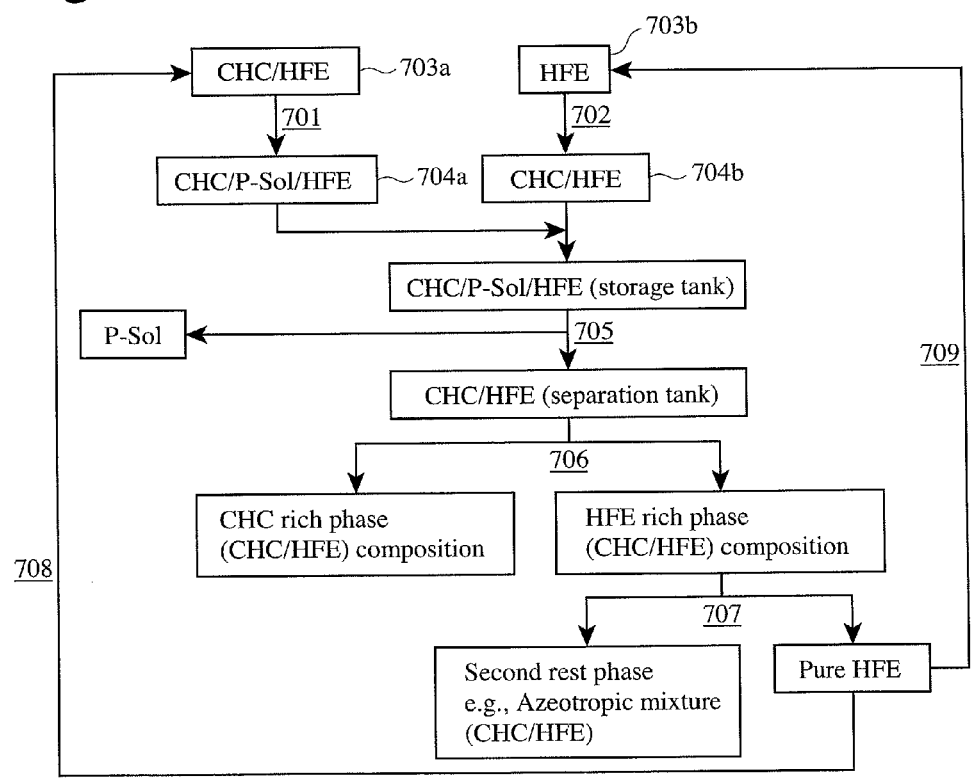
FIG. 7 schematically shows an embodiment similar to the first embodiment except that following cooling a third product (comprising relatively pure HFE) and a fourth product are separated from the HFE-rich phase, where the third product is conducted to the first stage, the second stage, or both.

In another embodiment, the invention relates to a fourth method for removing diluent from a polymer extrudate. Steps (A) through (E) are the same as the steps described above for the first method. The numbering of 701 to 706 in FIG. 7 is analogous to that of 101 to 106 in FIG. 1. The fourth method differs from the first method in Step (F).

As can be seen in FIG. 7, Step (F) of the fourth method is similar to Step (F) of the third method, except that in the fourth method the HFE is purified instead of the CHC. Since HFE is used in the both the washing stage and the rinsing stage, the purified HFE (also called the third product) separated from the HFE-rich phase of Step (E) can be conducted to either the washing stage (Step (A)), the rinsing stage (Step (B)), or both, Step (F) of the fourth method will now be described in more detail.

After cooling the HFE-CHC stream of Step (E) to produce an HFE-rich phase and a CHC-rich phase, a third and fourth product are separated from the FIFE-rich phase. The third product comprises (or consists of or consists essentially of) FIFE. Preferably the third product is relatively pure HFE. In this context, "relatively pure" means 95 wt. % HFE or purer. When relatively pure CHC and relatively pure HFE are desired, the third method can be used with the fourth method. The method selected for separating the third product is not critical, as long the third product comprises a major amount of FIFE, preferably a relatively pure FIFE. For example, an azeotropic distillation of the HFE-rich phase can be conducted in a manner similar to the distillation described for the distillation of the CHC-rich phase in the Third Method. The HFE-rich phase can be heated to a temperature in the range of from about boiling point of azeotropic composition to about the boiling temperature of a pure HFE. This step shows as 707 in FIG. 7. For example, when used $DCM/C_4F_9OCH_3$ as a washing solvent, and $C_4F_9OCH_3$ as a rinsing solvent, the temperature can be in the range of from about 35.8° C. to about 70° C. When the HFE-rich phase is distilled, an overhead vapor of an azeotropic composition can be obtained (the fourth product), and a purified HFE (the third product) can be as a lower liquid stream form a separation vessel.

After separating the third product comprising purified HFE (e.g., $C_4F_9OCH_3$), the third product can be conducted to Steps (A) and/or (B). This step shows as 708 and 709 in FIG. 7. Conducting the third product to step (A) is 708, and conducting the third product to step (B) is 709. In an embodiment, the purified HFE can be directly conducted to step (B). In another embodiment, after the purified HFE and a make-up and/or a recycled CHC can be combined with the HFE in order to adjust the composition of the washing solvent, and then the combined CHC and HFE can be conducted to step (A) to replenish at least a portion of the washing solvent. A recycling of CHC can be conducted as described in the description of the Third Method. When the washing solvent of Step (A) is an azeotrope of CHC and HFE, it can be desirable to conduct the fourth product to Step (A) instead of the first or second product (or in addition to the first or second product when HFE and or CHC can be added). This embodiment is referred to as the Sixth Method. The Sixth Method can be combined with the Fifth Method if desired, i.e., both the second and the fourth products are conducted to the washing stage for recycle to replenish at least a portion of the washing solvent (with compositional adjustment by adding HFE or CHC if needed).

In a Seventh Method the purified HFE (i.e., the third product) is recycled to replenish at least a portion of the washing solvent of Step (A) or to the rinsing solvent of Step (B). The CHC-rich phase from Step (E) can be recycled to replenish at least a portion of the washing solvent, if desired, with compositional adjustment if needed.

In an Eight Method, the third product is recycled to Step (A) to replenish at least a portion of the washing solvent, or to Step (B) to replenish at least a portion of the rinsing solvent, or both. The Eight method also involves recycling the fourth product and/or the CHC-rich phase to Step (A) to replenish at least a portion of the washing solvent, with compositional adjustment if needed.

In a Ninth Method, the third product is recycled to Step (A) to replenish at least a portion of the washing solvent, or to Step (B) to replenish at least a portion of the rinsing solvent, or the both Steps (A) and (B). The Ninth Method also involves recycling the second and/or fourth product to replenish at least a portion of the washing solvent. In a Tenth Method, the third product is recycled to replenish at least a portion of the washing solvent or to replenish at least a portion of the rinsing solvent, or both, The Tenth Method can also involve recycling at least one of the first product, the third product, and the fourth product to replenish at least a portion of the washing solvent.

All of the above embodiments are examples, and the invention is not to be interpreted as limited thereto. These embodiments are not restricted the scope of patent claims. Following the removal of at least a portion of the diluent (e.g., liquid paraffin) the pores of the extrudate, the following optional steps can be conducted to produce the microporous membrane.

[3] Optional Steps

The optional processing steps are generally the same as those described in PCT Patent Application WO/2007/117042. The optional steps can be used alone or in combination, and the order of the optional steps is not critical. Representative optional steps include (6) a stretching a microporous membrane (re-stretching or dry stretching); (7) a heat treatment step; (8) a cross-linking step; (9) a hydrophilic treatment step; and (10) a surface coating step;

[4] Microporous Membrane and Battery Separator

Conducting a step for removing at least a portion of the P-sol as described, and conducting one or more of the optional process steps if desired, results in the production of a microporous membrane. The microporous membrane can be used, e.g., as at least a part of a battery separator. Consequently, the invention relates to a method for producing a microporous membrane and a method for producing a battery separator including the method for removing a process solvent as described above.

In one embodiment, the invention relates to a method for producing a microporous membrane. The method is illustrated schematically in FIG. 8. The method comprises the steps of:

(1) mixing or otherwise combining one or more polymer resins (801),
(2) preparing a polymer solution by combining the polymer(s) form step (1) and a process solvent (P-sol) (802)
(3) extruding the solution (803) in order to prepare polymeric extrudate (804),
(4) optionally cooling the polymeric extrudate (805) and then optionally stretching the extrudate with or without re-heating (806),
(5) removing at least a portion of the P-sol by
(A) contacting the polymeric extrudate with hydrofluoroether(s) and chlorinated hydrocarbon(s) in a first stage to remove at least a portion of the P-sol from the polymeric extrudate and conducting away a first stream comprising at least a portion of the P-sol, at least a portion of the hydrofluoroether(s), and at least a portion of the chlorinated hydrocarbon(s) and washed polymeric extrudate containing residual chlorinated hydrocarbon(s) in pores (807);
(B) contacting the polymeric extrudate from step (A) with hydrofluoroether(s) in a second stage to remove at least a portion of the residual chlorinated hydrocarbon(s) from the pores of the washed extrudate and conducting a second stream away from the second stage, the second stream comprising at least a portion of the hydrofluoroether(s) of the second stage and at least a portion of the residual chlorinated hydrocarbon(s) (808),
(C) removing at least a portion of any remaining hydrofluoroether(s) ("HFE") in the pores of the extrudate (809);
(D) combining the first and second streams and then separating the process solvent ("P-sol") (812) from the combined streams to make a third stream comprising the HFE and chlorinated hydrocarbon(s) ("CHC") of the first and second streams;
(E) cooling the third stream (813) and separating HFE-rich phase from a CHC-rich phase (814).

In yet other embodiments, the invention relates to a process comprising steps A through E and the following step (F):
where step (F) is one or more of;
(a) conducting at least a portion of the CHC-rich phase from step (E) to replenish at least a portion of the hydrofluoroether(s) and/or chlorinated hydrocarbon(s) of step (A);
(b) conducting at least a portion of the HFE-rich phase from step (E) to replenish at least a portion of the hydrofluoroether(s) of step (A), step (B), or both;
(c) (i) separating a first product comprising purified CHC and a second product comprising HFE and CHC from the CHC-rich phase from step (E) (815), and then carrying out at least one of the following steps (c) (ii) or (c) (iii)
  (ii) conducting at least a portion of the first product to step to replenish at least a portion of the chlorinated hydrocarbon(s) of step (A),
  (iii) conducting at least a portion of the second product to the first stage (817), the second stage, or both,
(d) (i) separating a third product comprising purified FIFE and fourth product from the HFE-rich phase of step (E) (816), and then carrying out at least one of the following steps (d)(ii) or (d)(iii)
  (ii) conducting at least a portion of the third product to at least one of step (A) or (B) to replenish at least a portion of the hydrofluoroether(s) of steps (A) or (B) (818),
  (iii) conducting at least a portion of the fourth product to the first stage.

Figure 8:
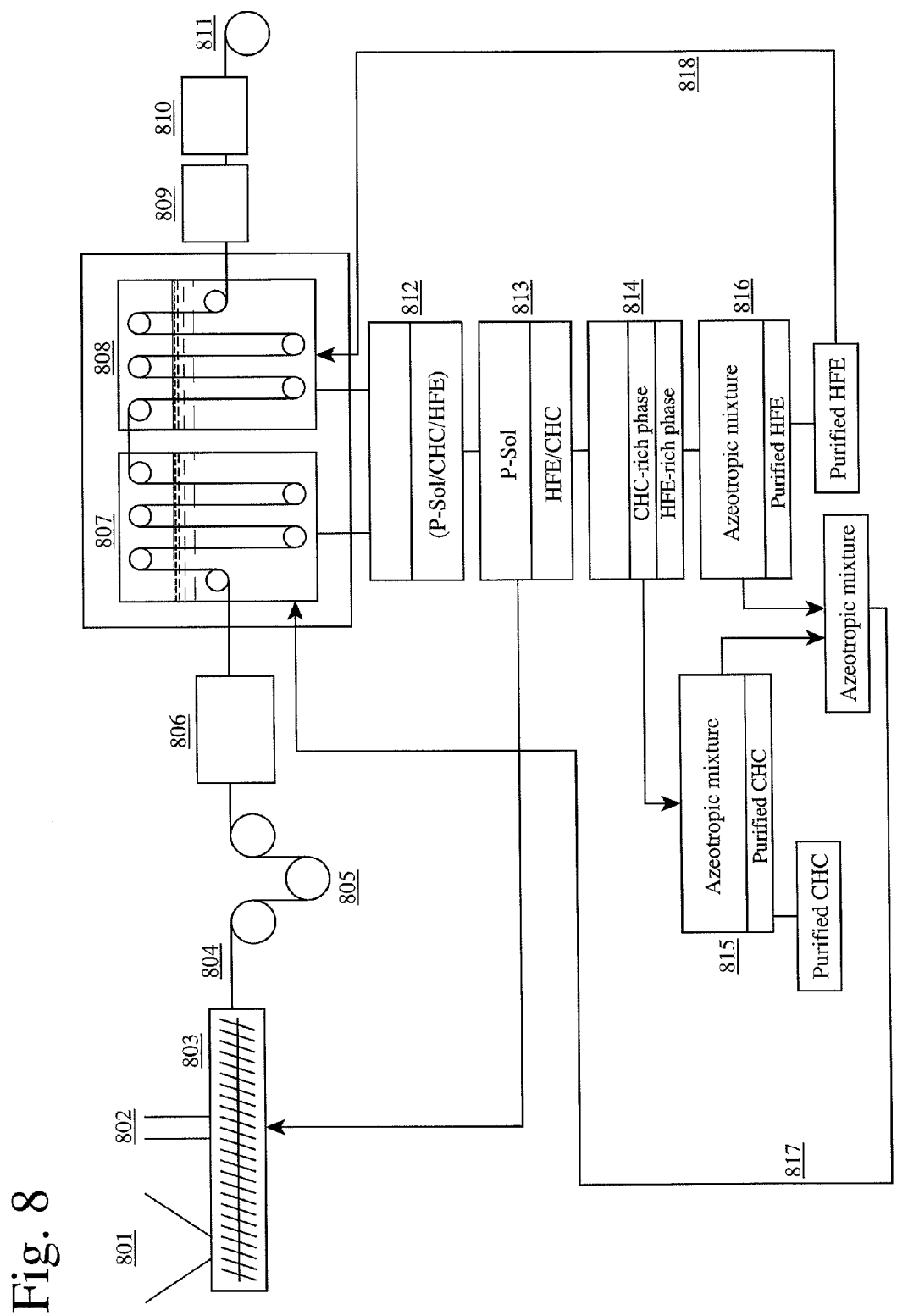
FIG. 8 schematically shows a continuous process for manufacturing microporous polymeric film, where a liquid paraffin solvent or diluent (the P-sol) is washed from the extrudate by an azeotropic mixture of DCM and HFE, and the washed extrudate is conducted to a second stage where HFE is used to rinse any residual DCM from the extrudate's pores. Purified DCM and HFE can be recovered for recycle to the process.

Referring again to FIG. 8 (a non-limiting example), the extrudate or stretched extrudate is conducting to a washing step (A) (807), and then the washed extrudate is conducted to a rinsing step (B) (808). In FIG. 8, the rinsing solvent is an azeotropic mixture of HFE-CHC, but the choice of rinsing solvent is not critical. The rinsed extrudate is conducted to a drying step (C) (809). After drying, the extrudate is converted into a microporous membrane. The microporous membrane can be conducting to an optional heat treatment step (810), and then the heat-treated microporous membrane can be optionally wound up for storage or further processing (811). First and second streams are conducted away from washing (A) and rinsing (B) respectively. The first and second streams are combined (812), and the P-sol is separated from the combined streams (e.g., by distillation) in step (D) (813). Following separation of the P-sol, which is conducted to Step (2) as shown, the combined streams are cooled to produce a CHC-rich phase and an HFE-rich phase in Step (E) (814). In Step (F), the CHC-rich and HFE-rich steams are further separated as shown to produce purified CHC, purified HFE, and an azeotrope of HFE and CHC (815 and 816). The Azeotrope is recycled to Step (A) to replenish at least a portion of the washing solvent conducted away with the first stream (817). The purified HFE is conducted to Step (B) to replenish at least a portion of the rinsing solvent (818).

In FIG. 8, the purified HFE is conducted to only step (B), but the purified FIFE can be also be conducted to step (A) by adding some CHC in order to meet a composition of the washing solvent. The purified CHC can be also conducted to step (A) by adding some FIFE in order to meet a composition of the washing solvent. Furthermore, the HFE-rich phase and CHC-rich phase can be also conducted to step (A) by adding some CHC or FIFE in order to meet a composition of the washing solvent.

[5] Examples

The following Examples are included to illustrate the practice of the invention.

Example 1

Figure 9:
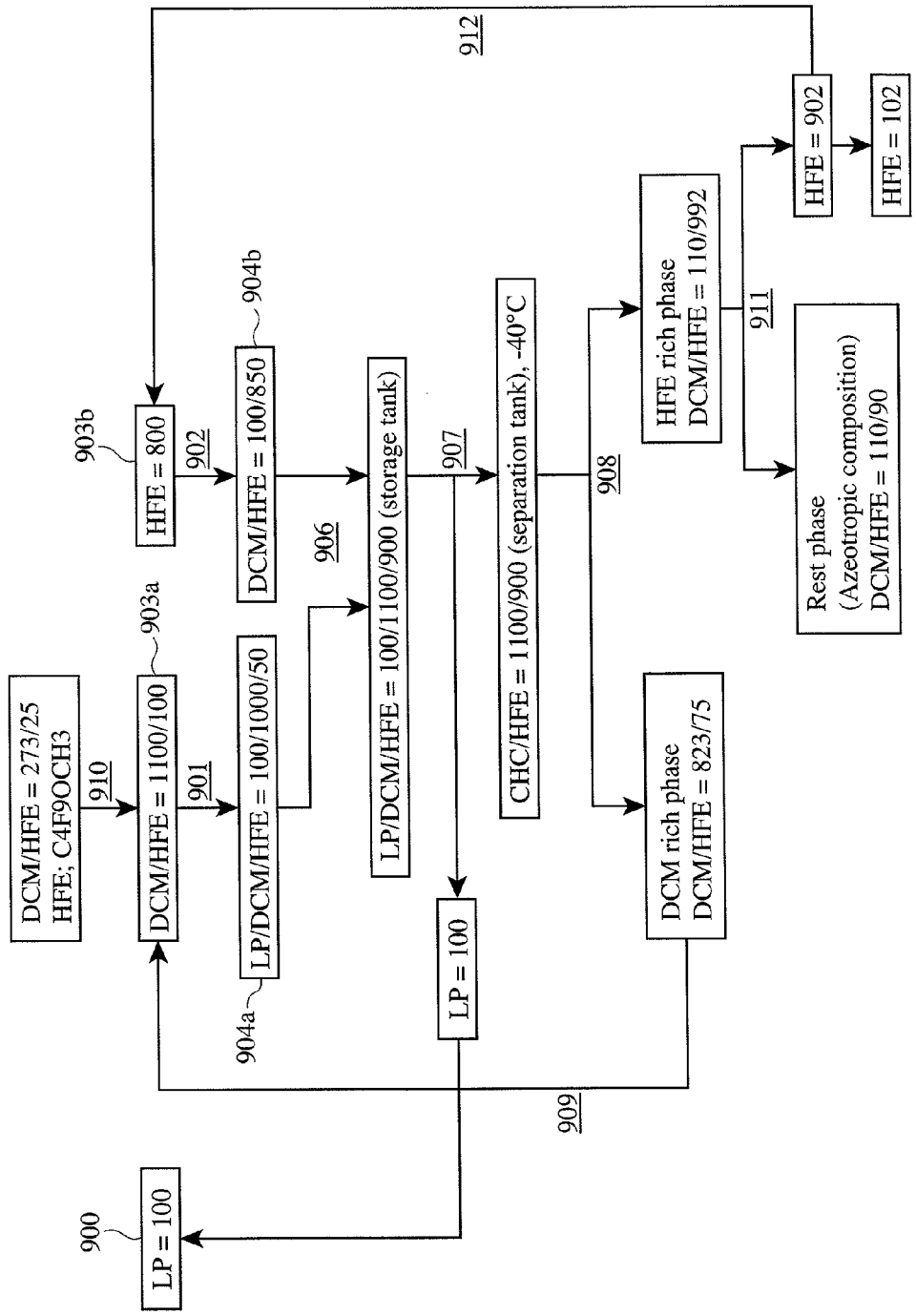
FIG. 9 schematically shows a material balance for solvent recovery when the temperature of the cooling step is −40° C.

FIG. 9 schematically shows the amount of DCM and HFE in the process steps described above in connection with the Ninth Method. Liquid paraffin (LP) (900) was used as a process solvent, DCM was used as CHC, and $C_4F_9OCH_3$ was used as HFE. Polymer extrudate containing LP was conducted to step (A) for LP removal (901). In step (A), a washing solvent (903a) comprised of 1100 wt. parts of DCM and 100 wt. parts of $C_4F_9OCH_3$, based on 100 wt. parts of LP. Hereinafter, when using "wt. parts", all of "wt. parts" is based on 100 wt. parts of LP. In other words, the washing solvent was consisted of 92 wt. % of DCM and 8 wt. % of $C_4F_9OCH_3$, based on the total amount of the washing solvent. After conducting the polymer extrudate to step (A), the washed polymer extrudate was conducted to a rinsing stage where the washed extrudate was rinsed with a rinsing solvent comprising 800 wt. parts of HFE, based on 100 wt. parts of LP (902). After conducting the polymer extrudate to step (B), a combined effluent stream was collected from Steps (A) and (B) which comprised 100 wt. parts of LP, 1100 wt. parts of DCM and 900 wt. parts of $C_4F_9OCH_3$. In FIG. 9, 903a, 903b shows all solvents used in steps of (A) and (B). In FIG. 9, 904a, 904b shows all solvent effluent generated in steps of (A) and (B). After collecting the waste stream (906), distillation of the waste stream (907) was conducted at a temperature of 70° C. under atmospheric pressure. After distillation of the combined effluent stream, 100 wt. parts of LP was left as a liquid, and 1100 wt. parts of DCM and 900 wt. parts of $C_4F_9OCH_3$ became vapor, and then the vapor of DCM and $C_4F_9OCH_3$ was collected, and cooled to room temperature in order to convert the vapor of DCM and $C_4F_9OCH_3$ into liquid of DCM and $C_4F_9OCH_3$. LP was reused as a process solvent, though this is optional.

In order to reuse DCM-rich phase as a washing solvent, a cooling separation of the liquid composition of DCM and $C_4F_9OCH_3$ from step (D) was conducted in Step (E) at the temperature of −40° C. to produce a DCM-rich phase containing 92 wt. % of DCM and 8 wt. % of $C_4F_9OCH_3$, based on the total weight of the DCM-rich phase (908). When the DCM-rich phase cooled to a temperature of −40° C., the DCM-rich phase was reused as a washing solvent (909). Since the recycled washing solvent contains 823 wt. parts of DCM and 75 wt. parts of $C_4F_9OCH_3$, a virgin composition of 273 wt. parts of DCM and 25 wt. parts of $C_4F_9OCH_3$ was added as make-up to the reused washing solvent in order to meet material balance (910).

When a cooling separation of the liquid composition of DCM and $C_4F_9OCH_3$ in Step (E) was conducted at a temperature of −40° C., a $C_4F_9OCH_3$-rich phase contained 110 wt. parts of DCM and 992 wt. parts of $C_4F_9OCH_3$. The $C_4F_9OCH_3$-rich phase was conducted to azeotropic distillation (911) at a temperature of 40° C. under atmospheric pressure, and then 902 wt. parts of purified $C_4F_9OCH_3$ and an azeotropic composition consisted of 110 wt. parts of DCM and 90 wt. parts of $C_4F_9OCH_3$ was obtained. After obtaining 902 wt. parts of $C_4F_9OCH_3$, 800 wt. parts of purified $C_4F_9OCH_3$ was reused as a rinsing solvent (912), the rest of 100 wt. parts of purified $C_4F_9OCH_3$ was stored in a storage region.

Example 2

Figure 10:
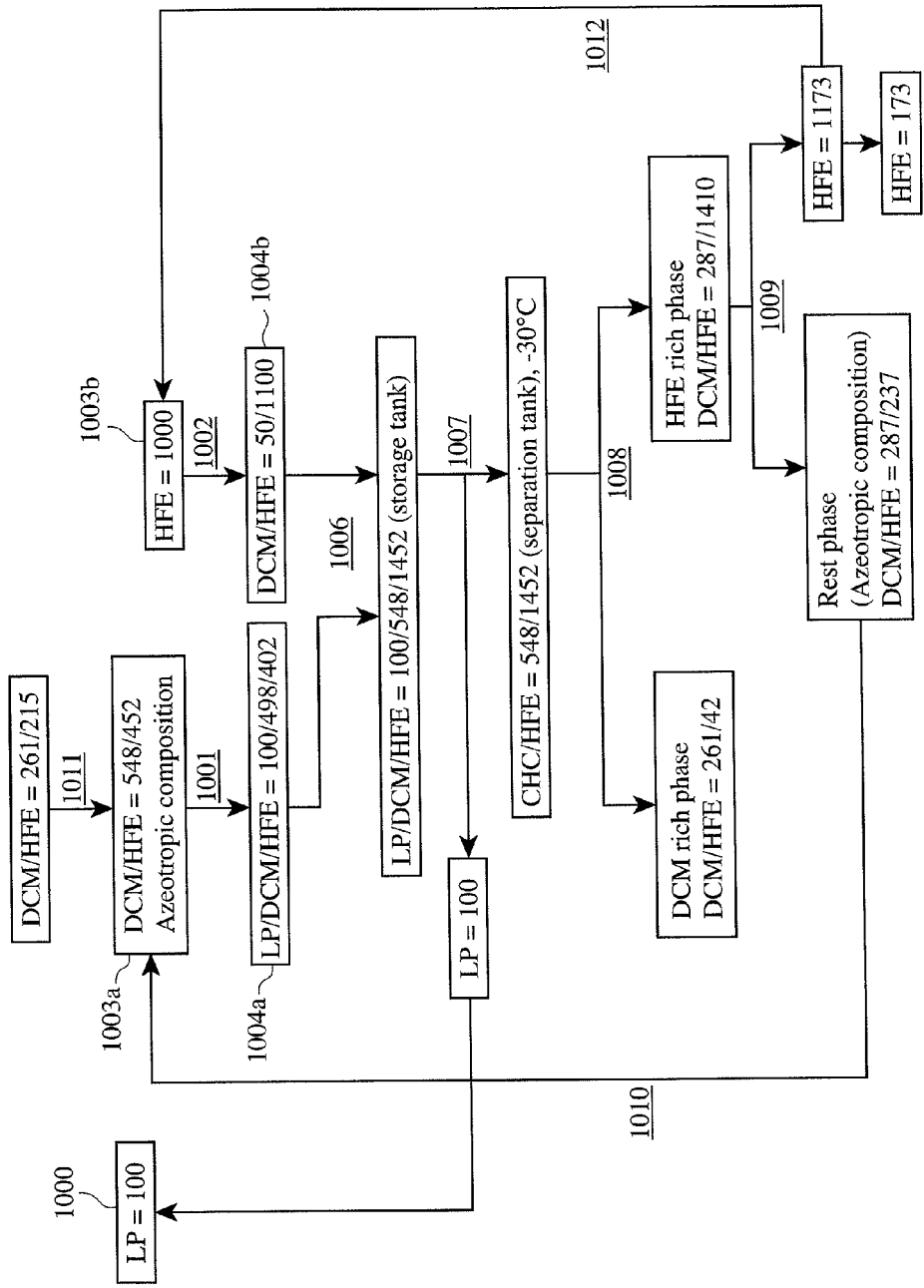
FIG. 10 schematically shows a material balance for solvent recovery when the temperature of the cooling step is −30° C.

FIG. 10 also schematically shows the amount of DCM and HFE in the process steps. In this example, liquid paraffin (LP) was used as a process solvent (1000), DCM was used as CHC, and $C_4F_9OCH_3$ was used as HFE. In this example, a purified $C_4F_9OCH_3$ and an azeotropic composition of DCM and $C_4F_9OCH_3$ was obtained by conducting azeotropic distillation of the HFE-rich phase, and purified HFE was recycled for re-use. The purified $C_4F_9OCH_3$ was reused as a rinsing solvent, and the azeotropic composition of DCM and $C_4F_9OCH_3$ was reused as a washing solvent.

Polymer extrudate containing LP was conducted to step (A) (1001). In this example, the washing solvent was an azeotropic composition of DCM and $C_4F_9OCH_3$ and the rinsing solvent was $C_4F_9OCH_3$. The azeotropic composition contained 548 wt. parts of DCM and 452 wt. parts of $C_4F_9OCH_3$. The rinsing solvent was 1000 wt. parts HFE, i.e., it contained relatively pure HFE. After conducting the polymer extrudate to step (A), the washed polymer extrudate was conducted to 1000 wt. parts of HFE (Step (B), (1002)). In FIG. 10, 1003a, 1003b means solvents used in this process, and 1004a, 1004b means effluent streams generated in this process. After conducting the polymer extrudate to step (B), effluent streams were withdrawn from Steps (A) and (B), which were then combined (1006). The combined effluent streams comprised 100 wt. parts of LP, 548 wt. parts of DCM and 1452 wt. parts of $C_4F_9OCH_3$. After collecting and combining the effluent stream, LP was separated from the combined streams by distillation (1007) at a temperature of 70° C. under atmospheric pressure. After LP separation, the combined effluent streams comprised 548 wt. parts of DCM and 1452 wt. parts of $C_4F_9OCH_3$. The LP was conducted away. LP was reused as a process solvent.

In order to separate DCM-rich phase and $C_4F_9OCH_3$-rich phase, the liquid composition of DCM and $C_4F_9OCH_3$ was conducted to step (E) (1008). In step (E), the combined effluent streams were cooled to a cooling temperature. The temperature to which the combined stream was selected so that a relatively pure $C_4F_9OCH_3$ was separated from the $C_4F_9OCH_3$-rich phase in a subsequent separation step. In this example, the combined effluent streams were cooled to a temperature of −30° C. However, the cooling temperature can range, e.g., from −20° C. to −50° C. After the cooling of Step (E), the liquid composition of DCM and $C_4F_9OCH_3$, 303 wt. parts of a DCM-rich phase and 1697 wt. parts of a $C_4F_9OCH_3$-rich phase were obtained. The $C_4F_9OCH_3$-rich phase contained 287 wt. parts of DCM and 1410 wt. parts of $C_4F_9OCH_3$. The $C_4F_9OCH_3$-rich phase was conducted to an azeotropic distillation at a temperature of 40° C. under atmospheric pressure in order to obtain 1173 wt. parts of purified $C_4F_9OCH_3$ as a reused rinsing solvent and 514 wt. parts of an azeotropic composition of 287 wt. parts of DCM and 237 wt. parts of $C_4F_9OCH_3$ as a washing solvent (1009).

Since the recycled washing solvent contained 287 wt. parts of DCM and 237 wt. parts of $C_4F_9OCH_3$ (1010), a virgin composition of 261 wt. parts of DCM and 215 wt. parts of $C_4F_9OCH_3$ was added as make-up to the recycled washing solvent in order to meet material balance (1011). Since the reused rinsing solvent contained 1173 wt. parts of $C_4F_9OCH_3$, 1000 wt. parts of purified $C_4F_9OCH_3$ was reused as a rinsing solvent (1012), the rest of 173 wt. parts of purified $C_4F_9OCH_3$ was conducted away from the process.

Example 3

This example describes the continuous production of a microporous membrane using one of the solvent recycle aspects of the invention. 99.625 weight parts of a polyethylene (PE) composition comprising 30 wt. % of ultra-high-molecular-weight polyethylene (UHMWPE) having a weight-average molecular weight (Mw) of $3.0 \times 10^6$, and 70 wt. % of high-density polyethylene (HDPE) having Mw of $3.3 \times 10^5$, were dry-blended with 0.375 parts by mass of tetrakis[methylene-3-(3,5-ditertiary-butyl-4-hydroxyphenyl)-propionate]methane as an antioxidant.

20 wt. parts of the resultant mixture was charged into a strong-blending double-screw extruder having an inner diameter of 58 mm and L/D of 52.5, and 80 wt. parts of liquid paraffin (50 cst at 40° C.) was supplied to the double-screw extruder via a side feeder. Melt-blending was conducted at 230° C. and 250 rpm to prepare a polyethylene solution. The polyethylene solution was extruded from a T-die mounted to a tip end of the double-screw extruder, and drawn and cooled by cooling rolls controlled at 50° C. while reeling up, to form a gel-like sheet having a thickness of 1.6 mm. Using a tenter-stretching machine, the gel-like sheet simultaneously biaxially stretched at 115° C., such that the stretching magnification was 5 fold in both longitudinal and transverse directions.

The washing and rinsing process was conducted as described in Example 2. The stretched gel-like sheet was immersed in a washing bath of a composition of 548 wt. parts of DCM and 452 wt. parts of $C_4F_9OCH_3$, and then rinsed in a rinsing bath of 1000 wt. parts of $C_4F_9OCH_3$, based on 100 wt. parts of liquid paraffin. In other words, a washing solvent was consisted of 438.4 wt. parts of DCM and 361.6 wt. parts of $C_4F_9OCH_3$, and a rinsing solvent was consisted of 800 wt. parts of $C_4F_9OCH_3$, based on 80 wt. parts of liquid paraffin.

Consequently, the total waste solvent of DCM was 438.4 wt. parts, and that of $C_4F_9OCH_3$ was 1161.6 wt. parts. The washed-rinsed gel-like sheet was dried by air at room temperature. The dried sheet was heat-set at 123° C. for 10 minutes by a tenter stretching machine, and then a polyolefin microporous membrane was obtained. The obtained polyolefin microporous membrane had a thickness of 25 µm, a porosity of 42% and an air permeability of 590 sec/100 cc.

After rinsing the washed gel-like sheet, solvent recovery process was conducted as described in Example 2. This example describes a recovery process of liquid paraffin solvent, based on 80 wt. parts of liquid paraffin. All solvent effluents from washing and rinsing the extrudate (i.e., liquid paraffin, DCM and $C_4F_9OCH_3$) were collected into a storage tank, and the combined effluent was transferred into a separation tank. After LP separation, the combined effluent was then cooled to a temperature of −30° C. in the separation tank, and then a DCM-rich phase and $C_4F_9OCH_3$-rich phase were obtained. The DCM-rich phase comprised of 208.8 wt. parts of DCM and 33.6 wt. parts of $C_4F_9OCH_3$, and the $C_4F_9OCH_3$-rich phase comprised 229.6 wt. parts of DCM and 1128 wt. parts of $C_4F_9OCH_3$. Distillation of the $C_4F_9OCH_3$-rich phase at a temperature of 40° C. under atmospheric pressure was used to obtain 938.4 wt. parts of purified $C_4F_9OCH_3$ and 419.2 wt. parts of an azeotropic composition of DCM (229.6 wt. parts) and $C_4F_9OCH_3$ (189.6 wt. parts). The purified $C_4F_9OCH_3$ (938.4 wt. parts) was divided into 800 wt. parts of a first purified $C_4F_9OCH_3$, and 138.4 wt. parts of a second purified $C_4F_9OCH_3$. The first purified $C_4F_9OCH_3$ was conducted to the rinsing step as a recycle rinsing solvent, and the second purified $C_4F_9OCH_3$ was stored. The azeotropic composition of DCM (229.6 wt. parts) and $C_4F_9OCH_3$ (189.6 wt. parts) was conducted to the washing step. In order to meet a material balance, a new azeotropic composition of DCM (208.8 wt. parts) and $C_4F_9OCH_3$ (172.0 wt. parts) was conducted to the washing step. Consequently, total amount of the azeotropic composition was consisted of 438.4 wt. parts of DCM and 361.6 wt. parts of $C_4F_9OCH_3$. As described above, the purified 800 wt. parts of $C_4F_9OCH_3$ was reused as a rinsing solvent, and the azeotropic composition of DCM (229.6 wt. parts) and $C_4F_9OCH_3$ (189.6 wt. parts) was reused as a washing solvent. Consequently, a continuous production of microporous membrane was conducted.

Embodiments of this invention are the followings:

1. A method for removing a diluent from pores of a porous polymeric extrudate, comprising:

(A) contacting the polymeric extrudate with hydrofluoroether(s) and chlorinated hydrocarbon(s) in a first stage to remove at least a portion of the diluent from the pores of the polymeric extrudate and conducting away a first stream of comprising at least a portion of the process solvent, at least a portion of the hydrofluoroether(s), and at least a portion of the chlorinated hydrocarbon(s).

2. The method of recited in 1 above further comprising (B) contacting the polymeric extrudate from step (A) with hydrofluoroether(s) in a second stage to remove at least a portion of any chlorinated hydrocarbon(s) from the pores of the washed extrudate and conducting a second stream away from the second stage, the second stream of comprising at least a portion of the hydrofluoroether(s) of the second stage and at least a portion of the chlorinated hydrocarbon(s) removed from the pores.

3. The method of recited in 1 or 2 above further comprising (C), drying the polymeric extrudate of step (B) to remove at least a portion of any remaining hydrofluoroether(s) in the pores of the extrudate.

4. The method of recited in 1-3 above, further comprising (D) at least one of combining the first and second streams and then separating the diluent from the combined streams to make a third stream comprising the hydrofluoroether(s) and chlorinated hydrocarbon(s) of the first and second streams; or separating the diluent from the first stream and then combining the first and second streams to make a third stream comprising the hydrofluoroether(s) and chlorinated hydrocarbon(s) of the first and second streams.

5. The method of recited in 1-4 above, further comprising (E) cooling the third stream and separating from the third stream a first phase comprising a major amount of hydrofluoroether(s) and a second phase comprising a major amount of chlorinated hydrocarbon(s).

6. The method of recited in 1-5 above, further comprising step (F), where step (F) is one or more of (a) conducting at least a portion of the first phase from Step (E) to step (A) to at least partially replenish the chlorinated hydrocarbon(s) of Step (A);

(b) conducting at least a portion of the second phase from Step (E) to Step (A), Step (B), or both to at least partially replenish the hydrofluoroether(s) of Step (A), Step (B), or both;

(c) (i) separating a first product comprising chlorinated hydrocarbon(s) and a second product comprising chlorinated hydrocarbon(s) and hydrofluoroether(s) from the first phase, and then carrying out at least one of the following Steps (c) (ii) or (c) (iii)

(ii) conducting purified at least a portion of the first product to step (A) to at least partially replenish the chlorinated hydrocarbon(s) of Step (A), (iii) conducting at least a portion of the second product to the Step (A), Step (B), or both, to at least partially replenish the hydrofluoroether(s) of Step (A), Step (B), or both;

(d) (i) separating a third product comprising a major amount of hydrofluoroether(s) and fourth product from the second phase of Step (E), and then carrying out the at least one of the following steps (d)(ii) or (d)(iii)

(ii) conducting at least a portion of the third product to at least one of steps (A) or (B) to at least partially replenish the hydrofluoroether(s) of Step (A), Step (B), or both, (iii) conducting at least a portion of the fourth product to Step (A) to at least partially replenish the chlorinated hydrocarbon(s) of Step (A).

7. The method of recited in 1-6 above, wherein the polymer extrudate comprises polyolefin.

8. The method of recited in 1-7 above, wherein the diluent is liquid paraffin.

9. The method of recited in 1-8 above, wherein the hydrofluoroether is $C_4F_9OCH_3$.

10. The method of recited in 1-9 above, wherein the chlorinated hydrocarbon is dichloromethane.

11. A method for producing a microporous membrane, comprising the steps of:

(2) combining polymer resin(s) and a diluent to form a polymeric solution, (3) extruding the polymeric solution to produce a polymeric extrudate, (5) removing at least a portion of the diluent from the extrudate by the steps of (A) contacting the polymeric extrudate with hydrofluoroether(s) and chlorinated hydrocarbon(s) in a first stage to remove at least a portion of the diluent from the pores of the polymeric extrudate and conducting away a first stream of comprising at least a portion of the process solvent, at least a portion of the hydrofluoroether(s), and at least a portion of the chlorinated hydrocarbon(s);

(B) contacting the polymeric extrudate from step (A) with hydrofluoroether(s) in a second stage to remove at least a portion of any chlorinated hydrocarbon(s) from the pores of the washed extrudate and conducting a second stream away from the second stage, the second stream of comprising at least a portion of the hydrofluoroether(s) of the second stage and at least a portion of the chlorinated hydrocarbon(s) removed from the pores;

(C) optionally drying the polymeric extrudate of step (B) to remove at least a portion of any remaining hydrofluoroether(s) in the pores of the extrudate;

(D) at least one of combining the first and second streams and then separating the diluent from the combined streams to make a third stream comprising the hydrofluoroether(s) and chlorinated hydrocarbon(s) of the first and second streams; or separating the diluent from the first stream and then combining the first and second streams to make a third stream comprising the hydrofluoroether(s) and chlorinated hydrocarbon(s) of the first and second streams.

12. The method of recited in 11 above, further comprising separating hydrofluoroether(s) and/or chlorinated hydrocarbon(s) from the third stream and recycling at least a portion of the hydrofluoroether(s) to the Step (A), Step (B), or both, and/or recycling at least a portion of the chlorinated hydrocarbon(s) to Step (A); and wherein the process further comprises a Step (1) of combining one or more polymer resins prior to Step (2).

13. The method of recited in 11 or 12 above, further comprising Step (5)(E) of cooling the third stream and separating from the third stream a first phase comprising a major amount of hydrofluoroether(s) and a second phase comprising a major amount of chlorinated hydrocarbon(s).

14 The method of recited in 11-13 above, further comprising Step 5 (F), where Step 5(F) is one or more of (a) conducting at least a portion of the first phase from Step (E) to Step (A) to at least partially replenish the chlorinated hydrocarbon(s) of Step (A);

(b) conducting at least a portion of the second phase from Step (E) to Step (A), Step (B), or both to at least partially replenish the hydrofluoroether(s) of Step (A), Step (B), or both;

(c) (i) separating a first product comprising chlorinated hydrocarbon(s) and a second product comprising chlorinated hydrocarbon(s) and hydrofluoroether(s) from the first phase, and then carrying out at least one of the following Steps (c) (ii) or (c) (iii)

(ii) conducting purified at least a portion of the first product to step (A) to at least partially replenish the chlorinated hydrocarbon(s) of Step (A), (iii) conducting at least a portion of the second product to the Step (A), Step (B), or both, to at least partially replenish the hydrofluoroether(s) of Step (A), Step (B), or both;

(d) (i) separating a third product comprising a major amount of hydrofluoroether(s) and fourth product from the second phase of Step (E), and then carrying out the at least one of the following steps (d)(ii) or (d)(iii)

(ii) conducting at least a portion of the third product to at least one of steps (A) or (B) to at least partially replenish the hydrofluoroether(s) of Step (A), Step (B), or both, (iii) conducting at least a portion of the fourth product to Step (A) to at least partially replenish the chlorinated hydrocarbon(s) of Step (A).

15. The method of recited in 11-14 above, wherein the polymer extrudate comprises polyolefin.

16. The method of recited in 11-15 above, wherein the diluent is liquid paraffin.

17. The method of recited in 11-16 above, wherein the hydrofluoroether is one or more of $C_4F_9OCH_3$, $C_4F_9OC_2H_5$ and $C_6F_{13}OCH_3$.

18. The method of recited in 11-17 above, wherein the chlorinated hydrocarbon is one or more of trichloromethane, tetrachloromethane, 1,1-dichloroethane, 1,2-dichloroethane, and trichloroethane.

19. The method of recited in 11-18 above, wherein the hydrofluoroether(s) and chlorinated hydrocarbon(s) of Step (A) comprise an azeotrope.

20. The method of recited in 11-19 above, wherein the hydrofluoroether of Step (A) is the same as the hydrofluoroether of Step (B), and wherein the hydrofluoroether is one or more of $C_4F_9OCH_3$, $C_4F_9OC_2H_5$ and $C_6F_{13}OCH_3$.

21. The method of recited in 13-20 above, wherein the third stream is cooled to a temperature of no warmer than about $-14°$ C.

22. The method of recited in 13-20 above, wherein the third stream is cooled to a temperature in the range of from about $-20°$ C. to about $-50°$ C.

23. A microporous membrane made by the method of recited in 11-22 above.

24. A battery comprising an anode, a cathode, an electrolyte, and the microporous membrane of recited in 11-23 above.

The invention claimed is:

1. A method for removing a process solvent from a polymer extrudate, comprising:

(A) contacting the polymer extrudate with hydrofluoroether (HFE) and chlorinated hydrocarbon (CHC) to remove at least a portion of the process solvent ("P-sol") from the polymer extrudate and forming a first waste stream of P-sol, HFE and CHC, wherein the composition of HFE and CHC has a UCST phase diagram;

(B) contacting the polymer extrudate from the step (A) with HFE to remove at least a portion of the CHC from the polymer extrudate and forming a second waste stream of HFE and CHC;

(D) combining the first and second waste streams and then separating the P-sol from the combined streams to make an HFE-CHC stream;

(E) cooling the HFE-CHC stream to make an HFE-rich phase and a CHC-rich 15 phase; and further comprising at least one step (F) selected from the group consisting of the following (a) to (d);

(a) conducting the CHC-rich phase to the step (A), (b) conducting the HFE-rich phase to the step (A), (c) (i) purifying the CHC-rich phase, and then carrying out the following steps (ii) and/or (iii), (ii) conducting purified CHC to the step (A), (iii) conducting a first rest phase after excluding purified CHC to the step (A), (d) (i) purifying the HFE-rich phase, and then carrying out the following steps (ii) and/or (iii), (ii) conducting purified HFE to the step (A) and/or (B), (iii) conducting a second rest phase after excluding purified HFE to the step (A).

2. The method according to claim 1, further comprising a step (C) of drying the polymer extrudate to remove at least some of the HFE between the steps (B) and (D).

3. The method according to claim 1, wherein the polymer extrudate comprises at least one polyolefin and at least one process solvent (P-sol) for polyolefin.

4. The method according to claim 1, wherein cooling the HFE-CHC stream in step (E) is conducted at a temperature of no more than −14° C.

5. The method according to claim 1, wherein purifying the CHC-rich phase in (c)(i) of step (F) is an azeotropic distillation of the CHC-rich phase.

6. The method according to claim 1, wherein the first rest phase in (c)(iii) of step (F) forms an azeotropic composition.

7. The method according to claim 1, wherein purifying the HFE-rich phase in (d)(i) of step (F) is an azeotropic distillation of the HFE-rich phase.

8. The method according to claim 1, wherein the second rest phase in (d)(iii) of step (F) forms an azeotropic composition.

9. The method according to claim 1, further comprising the step of contacting the polymer extrudate with at least one first sealing solvent before step (A).

10. The method according to claim 2, further comprising the step of contacting the polymer extrudate with at least one second sealing solvent after step (C) or between steps (B) and (C).

11. The method according to claim 1, further comprising recycling the solvent.

\* \* \* \* \*